(12) United States Patent
Clark

(10) Patent No.: US 8,924,909 B2
(45) Date of Patent: Dec. 30, 2014

(54) MICROELECTROMECHANICAL SYSTEM DESIGN AND LAYOUT

(71) Applicant: Purdue Research Foundation, West Lafayette, IN (US)

(72) Inventor: Jason V. Clark, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 13/906,974

(22) Filed: May 31, 2013

(65) Prior Publication Data

US 2013/0339918 A1  Dec. 19, 2013

Related U.S. Application Data

(60) Provisional application No. 61/658,998, filed on Jun. 13, 2012, provisional application No. 61/724,345, filed on Nov. 9, 2012, provisional application No. 61/724,427, filed on Nov. 9, 2012.

(51) Int. Cl.
| | |
|---|---|
| *G06F 17/50* | (2006.01) |
| *G06F 19/00* | (2011.01) |
| *G06K 9/62* | (2006.01) |
| *G06G 7/48* | (2006.01) |

(52) U.S. Cl.
CPC ........ *G06F 17/5072* (2013.01); *G06F 17/5081* (2013.01); *G06F 2217/66* (2013.01); *G06F 17/5036* (2013.01); *G06F 2217/12* (2013.01); *G06F 19/00* (2013.01); *G06G 7/48* (2013.01); *G06K 9/62* (2013.01); *G06F 2217/64* (2013.01); *G06F 17/5068* (2013.01); *G06F 17/5086* (2013.01); *G06F 2217/08* (2013.01); *Y02T 10/82* (2013.01)
USPC ............. 716/122; 716/123; 716/132; 716/55; 703/7; 703/14; 700/98; 700/118; 700/121; 382/154

(58) Field of Classification Search
CPC ............ G06F 17/5072; G06F 17/5036; G06F 17/5081; G06F 17/5086; G06F 17/5068; G06F 2217/08; G06F 2217/12; G06F 2217/64; G06F 2217/66; G06F 19/00; G06G 7/48; G06K 9/62; Y02T 10/82
USPC ................. 716/122, 123, 132, 55; 703/7, 14; 700/98, 118, 121; 382/154
See application file for complete search history.

(56) References Cited

U.S. PATENT DOCUMENTS

| | | | |
|---|---|---|---|
| 6,360,191 B1 | 3/2002 | Koza et al. | |
| 6,614,430 B1 * | 9/2003 | Rappoport | .................... 345/420 |

(Continued)

FOREIGN PATENT DOCUMENTS

WO   WO2010005546 A1   1/2010

OTHER PUBLICATIONS

Apostolyuk, V. "Automated Design of Micromechanical Gyroscopes." Published online 2004 Astrise Corporation, available at www.astrise.com (total 3 pgs.).

(Continued)

*Primary Examiner* — Phallaka Kik
(74) *Attorney, Agent, or Firm* — Lee & Hayes, PLLC; Christopher J. White

(57) ABSTRACT

Methods for producing layout data for devices are described. One method includes using a genetic algorithm to determine a structure of a thermally-operated actuator. Another method includes receiving a three-dimensional model of a device, a design-rule set, and parameter ranges. Layout data are produced for devices having various combinations of parameter values in the parameter ranges.

10 Claims, 28 Drawing Sheets

(56) References Cited

U.S. PATENT DOCUMENTS

| | | | |
|---|---|---|---|
| 6,624,729 B2* | 9/2003 | Wright et al. ............. | 333/238 |
| 6,925,390 B2 | 8/2005 | Staats | |
| 7,155,689 B2* | 12/2006 | Pierrat et al. ............. | 716/52 |
| 7,287,240 B2* | 10/2007 | Toyama et al. ............. | 716/52 |
| 7,669,152 B1* | 2/2010 | Tcherniaev et al. ......... | 716/136 |
| 7,895,560 B2* | 2/2011 | Lovell ..................... | 716/119 |
| 8,490,000 B2* | 7/2013 | Okuwaki et al. ............ | 715/752 |
| 8,718,354 B2* | 5/2014 | Stroessner et al. .......... | 382/145 |
| 2002/0084876 A1* | 7/2002 | Wright et al. ............. | 333/238 |
| 2005/0076316 A1* | 4/2005 | Pierrat et al. ............. | 716/4 |
| 2005/0262468 A1* | 11/2005 | Mesuda et al. ............. | 716/19 |
| 2006/0141365 A1* | 6/2006 | Toyama et al. ............. | 430/5 |
| 2006/0225003 A1 | 10/2006 | Agogino et al. | |
| 2007/0194225 A1 | 8/2007 | Zorn | |
| 2012/0158370 A1* | 6/2012 | Logatoc .................... | 703/1 |
| 2012/0179282 A1* | 7/2012 | Sarma et al. ............... | 700/98 |

OTHER PUBLICATIONS

Kamalian, R. et al., "Optimized design of MEMS by evolutionary multi-objective optimization with interactive evolutionary computation," Proc. Genetic Evol. Comput. Conf., Seattle, WA, Jun. 2004, pp. 1030-1041 (total 12 pgs.).

Koza, J. et al., "Automated Synthesis of Computational Circuits Using Genetic Programming," Proc. of Second Annual Genetic Programming Conference, Stanford, Jul. 13-16, 1997 (total 6 pgs.).

Fan, Z. et al., "System-Level Synthesis of MEMS via Genetic Programming and Bond Graphs," Genetic and Evolutionary Computing Conf., Chicago, Springer, Lecture Notes in Computer Science, Jul. 2003. pp. 2058-2071 (total 14 pgs.).

Li, H. et al., "Evolutionary Techniques in MEMS Synthesis," 25th Biennial Mechanisms Conf., ASME Design Engineering Technical Conf., Atlanta, GA, 1998 (total 5 pgs.).

Lohn, J. D., et al., "Automated Design of a MEMS Resonator", Proceedings of the Congress on Evolutionary Computation, pp. 3486-3491, 2007 (total 6 pgs.).

Zhou, N. et al., "Automated Design Synthesis for Micro-Electro-Mechanical Systems (MEMS)," Proc. of ASME Design Automation Conference, Montreal, Canada, Sep.-Oct. 2002 (total 7 pgs.).

Eddy, D. R. et al., "Application of MEMS technology in automotive sensors and actuators," Proceedings of the IEEE, vol. 86, No. 8, pp. 1747-1755, Aug. 1998 (total 9 pgs.).

Yazdi, F. et al., "Micromachined inertial sensors," Proceedings of the IEEE, vol. 86, No. 8, pp. 1640-1659, 1998 (total 20 pgs.).

Alper, S. E. et al., "A Single-Crystal Silicon Symmetrical and Decoupled MEMS Gyroscope on an Insulating Substrate," Journal of Microelectromechanical Systems, vol. 14, No. 4, Aug. 2005 (total 11 pgs.).

Clark, J. V. et al., "Modeling, Simulation, and Verification of an Advanced Micromirror Using Sugar", Journal of Microelectromechanical Systems, vol. 16, No. 6, pp. 1524-1536, Dec. 2007 (total 13 pgs.).

Clark, J. V. et al., "3D MEMS Simulation Modeling Using Modified Nodal Analysis," Proceedings of the Microscale Systems: Mechanics and Measurements Symposium, Jun. 2000, pp. 68-75 (total 8 pgs.).

Dong, H. et al., "Design and Analysis of a MEMS Comb Vibratory Gyroscope", University of Bridgeport, ASEE Northeast Section Conference, 2009 (total 132 pgs.).

Apostolyuk, V., "Theory and design of micromechanical vibratory gyroscopes", MEMS/NEMS Handbook, Springer, 2006, vol. 1, pp. 173-195 (total 20 pgs.).

Kamalian, R. et al., "A Comparison of MEMS Synthesis Techniques," Proceedings of the 1st Pacific Rim Workshop on Transducers and Micro/Nano Technologies, pp. 239-242, 2002 (total 4 pgs.).

Zhang, Y. et al., "MEMS Design Synthesis and Optimization." Published online, Nov. 2004 (total 2 pgs.).

Liang, Y, MEMS Pro V3 Component Design Tools, Mar. 6, 2002 (total 6 pgs.).

Phoenix, B. V. "MaskEngineer." Published online Aug. 2010 and available at http://www.phoenixbv.com (total 2 pgs.).

softMEMS. "MEMS Pro v6.0." Published online May 2010 and available at http://www.softmems.com/mems_pro.html (total 4 pgs.).

Koza, John R. et al., "Automated Synthesis of Analog Electrical Circuits by Means of Genetic Programming," IEEE Tec 1997, Paper TEC #26—Version 4—submitted Jun. 12, 1997 (total 64 pgs.).

Marapalli, P. et al., "SugarCube: An Online Tool for Determining Geometry as a Function of Performance of Ready-Made MEMS." Presented at University Government Industry Micro/Nano Symposium (UGIM) 2010 (total 5 pgs.).

Marapalli, P. et al., "An Online Mems Design Tool That Lays Out and Simulates a Parameterized Array From a Reference Device", presented at Microtech 2011 (total 2 pgs.).

Marapalli, P. et al., "SugarCube: An Online CAD Tool for Parametrically Investigating the Performance of Ready-Made MEMS" Nanotech 2010, vol. 2 pp. 689-692, 2010 (total 4 pgs.).

Li, Fengyuan et al., "SUGAR—Cantilever Simulation: Quick Example." Published online Sep. 2008 (total 7 pgs.).

Li, Fengyuan et al., "SUGAR—Cantilever Simulation: Manual" , published online, Sep. 2008 (total 13 pgs.).

Bindel, David et al., "Sugar 3.0: A MEMS Simulation Program (User's Guide)", published online Apr. 20, 2002 (total 34 pgs.).

Buchanan, J. R., "The GDSII Stream Format", published online Jun. 11, 1996 (total 7 pgs.).

* cited by examiner

FIG. 12C

MICROELECTROMECHANICAL SYSTEM DESIGN AND LAYOUT

CROSS-REFERENCE TO RELATED APPLICATIONS

This application is a nonprovisional application of, and claims priority to, U.S. Provisional Patent Application Nos. 61/724,427, filed Nov. 9, 2012; 61/658,998, filed Jun. 13, 2012; and 61/724,345, filed Nov. 9, 2012, the entirety of each of which is incorporated herein by reference.

STATEMENT OF FEDERALLY SPONSORED RESEARCH OR DEVELOPMENT

This invention was made with government support under CNS-0941497 awarded by the National Science Foundation. The government has certain rights in the invention.

FIELD OF THE INVENTION

The present application relates to microelectromechanical systems (MEMS), and particularly to producing designs or layout data used in the fabrication of such systems.

BACKGROUND OF THE INVENTION

MEMS are commonly fabricated on silicon (Si) or silicon-on-insulator (SOI) wafers, much as standard integrated circuits are. However, MEMS devices include moving parts on the wafers as well as electrical components. Examples of MEMS devices include gyroscopes, accelerometers, and microphones. MEMS devices are commonly designed and simulated, and then laid out. The layout process provides data used by a wafer fab to produce the devices. MEMS devices are commonly very time-intensive to design and lay out. There is, therefore, a need for ways of accelerating or otherwise improving the design and layout processes of MEMS devices. US20070194225 by Zorn describes using genetic algorithms to evolve circuits used with MEMS components, but not the MEMS themselves. U.S. Pat. No. 6,360,191 to Koza et al. describes using genetic operations to evolve circuits, but does not consider MEMS devices. US20060225003 by Agogino et al. generates designs and requests human input.

Reference is made to the following:
[1] Agogino, A., Kamalian, R., and Zhou, N., "A Comparison of MEMS Synthesis Techniques," Proceedings of the 1st Pacific Rim Workshop on Transducers and Micro/Nano Technologies, pp. 239-242, 2002.
[2] Kamalian, R., Takagi, H., and Agogino, A., "Optimized design of MEMS by evolutionary multi-objective optimization with interactive evolutionary computation," Proc. Genetic Evol. Comput. Conf., Seattle, Wash., June 2004, pp. 1030-1041.
[3] Koza, J., Bennett III, F. H., Lohn J., Dunlap, F., Keane M. A., and Andre, D. "Automated Synthesis of Computational Circuits Using Genetic Programming," Proc. of Second Annual Genetic Programming Conference, Stanford, Jul. 13-16, 1997.
[4] Fan, Z., Seo, K., Hu, J., Rosenberg, R., and Goodman, E.: "System-Level Synthesis of MEMS via Genetic Programming and Bond Graphs," Genetic and Evolutionary Computing Conf., Chicago, Springer, Lecture Notes in Computer Science, July, 2003. pp. 2058-2071.
[5] Li, H. and Antonsson, E. K.: "Evolutionary Techniques in MEMS Synthesis," 25th Biennial Mechanisms Conf., ASME Design Engineering Technical Conf., Atlanta, Ga., 1998.
[6] Lohn, J. D., Kraus, W. F. and Hornby, G. S. "Automated Design of a MEMS Resonator", Proceedings of the Congress on Evolutionary Computation, pp. 3486-3491, 2007.
[7] Zhou, N., Agogino, A., and Pister, K. S. J. "Automated Design Synthesis for Micro-Electro-Mechanical Systems (MEMS)," Proc. of ASME Design Automation Conference, Montreal, Canada, September-October, 2002.
Zhang, Y. "MEMS Design Synthesis and Optimization." Published online, November 2004.

Reference is also made to:
U.S. Pat. No. 6,925,390 to Staats.
Liang, Y. "MEMS Pro V3 Component Design Tools." Mar. 6, 2002.
PhoeniX B. V. "MaskEngineer." Published online, August 2010.
softMEMS. "MEMS Pro v6.0." Published online, May 2010

Reference is also made to:
[B1] A. Lawrence, *Modern Inertial Technology*, Springer-Verlag," New York, 1998.
[B2] D. S. Eddy, D. R. Sparks, "Application of MEMS technology in automotive sensors and actuators," *Proceedings of the IEEE*, vol. 86, no. 8, pp. 1747-1755, August 1998.
[B3] Y. Yazdi, F. Ayazi, and K. Najafi, "Micromachined inertial sensors," *Proceedings of the IEEE*, vol. 86, no. 8, pp. 1640-1659, 1998.
[B4] S. E. Alper, T. Akin. "A Single-Crystal Silicon Symmetrical and Decoupled MEMS Gyroscope on an Insulating Substrate," *Journal of Microelectromechanical Systems* vol. 14, no. 4, August 2005
[B5] J. V. Clark, K. S. J. Pister, "Modeling, Simulation, and Verification of an Advanced Micromirror Using SUGAR", *Journal of Microelectromechanical Systems*, vol. 16, no. 6, pp. 1524-1536, December, 2007.
[B6] J. V. Clark, N. Zhou, D. Bindel, etc., "3D MEMS Simulation Modeling Using Modified Nodal Analysis," *Proceedings of the Microscale Systems Mechanics and Measurements Symposium*, pp. 68-75, June, 2000.
[B8] A. Shkel, C. Acar, "MEMS Vibratory Gyroscopes Structural Approaches to Improve Robustness," Springer Verlag, 2008
[B9] H. Dong, X. Xiong, "Design and Analysis of a MEMS Comb Vibratory Gyroscope", *University of Bridgeport, ASEE Northeast Section Conference*, 2009
[B10] N. S. Nise, *Control System Engineering*," The Benjamin/Cummings Publishing, Inc, CA (1991)

The following documents are incorporated by reference herein:
Marepalli, P., and Clark, J. "SugarCube: An Online Tool for Determining Geometry as a Function of Performance of Ready-Made MEMS." Presented at University Government Industry Micro/Nano Symposium (UGIM) 2010.
Marepalli, P., and Clark, J. "An Online Mems Design Tool That Lays Out And Simulates A Parameterized Array From A Reference Device." Presented at Microtech 2011.
[B7] P. Marepallil, J. V. Clark, "SugarCube: An Online CAD Tool for Parametrically Investigating the Performance of Ready-Made MEMS" *Nanotech* 2010, vol. 2 pp. 689-692, 2010.
Li, F., et al. "SUGAR—Cantilever Simulation: Quick Example." Published online, September 2008.
Li, F., et al. "SUGAR—Cantilever Simulation: Manual." Published online, September 2008.

Bindel, D., et al, "SUGAR 3.0: A MEMS Simulation Program (User's Guide)." Published online, Apr. 20, 2002.

Buchanan, J. "The GDSII Stream Format." Published online, Jun. 11, 1996.

BRIEF DESCRIPTION OF THE INVENTION

According to an aspect of the invention, there is provided a method for producing layout data corresponding to a microelectromechanical system, the method comprising automatically performing the following steps using a controller:

receiving reference system performance characteristics;

producing a first population of structure genotypes, each structure genotype including geometric and thermal properties of each of a plurality of links in the microelectromechanical system, the geometric and thermal properties selected randomly;

simulating respective system performance characteristics of each of the structure genotypes in the first population;

determining a respective fitness rating of each of the structure genotypes in the first population by comparing the simulated respective system performance characteristics to the reference system performance characteristics;

producing a second population of structure genotypes using the first population and the determined fitness ratings;

iterating the simulating, determining-fitness-rating, and producing steps using the second population in place of the first population until one of the structure genotypes satisfies selected termination criteria; and automatically producing the layout data corresponding to the geometric properties in the one of the structure genotypes using the controller.

According to another aspect of the invention, there is provided a method for producing layout data corresponding to a reference microdevice, the method comprising performing the following steps using a controller:

receiving a three-dimensional model of the reference microdevice, the three-dimensional model including respective coordinates of a plurality of nodes and including one or more parameter(s);

receiving a design-rule set including respective constraint(s) on the parameter(s);

receiving respective parameter range(s) for the parameter(s), each parameter range including a plurality of values within the constraint(s) corresponding to the respective one of the parameter(s); and using the controller, automatically producing the layout data using the three-dimensional model and the parameter range(s), wherein the layout data includes two-dimensional data for each of one or more layer(s) and the layout data are produced by determining a plurality of combinations, each including one of the values in each of the parameter range(s), and, for each of the plurality of combinations, adjusting at least some of the coordinates in the three-dimensional model according to the values in that combination and converting the adjusted coordinates in the three-dimensional model to x-y coordinates and layer numbers, so that the layout data includes data for a plurality of microdevices.

According to another aspect of the invention, there is provided a non-transitory tangible computer-readable medium having computer-executable instructions stored thereon for processing data of a three-dimensional model of a reference microdevice, the instructions comprising:

instructions to automatically receive the three-dimensional model of the reference microdevice, the three-dimensional model including respective coordinates of a plurality of nodes and including one or more parameter(s);

instructions to receive a design-rule set including respective constraint(s) on the parameter(s);

instructions to receive respective parameter range(s) for the parameter(s), each parameter range including a plurality of values within the constraint(s) corresponding to the respective one of the parameter(s); and instructions to produce the layout data using the three-dimensional model and the parameter range(s), wherein the layout data includes two-dimensional data for each of one or more layer(s) and the instructions to produce the layout data include instructions to determine a plurality of combinations, each including one of the values in each of the parameter range(s), and instructions to, for each of the plurality of combinations, adjust at least some of the coordinates in the three-dimensional model according to the values in that combination and to convert the adjusted coordinates in the three-dimensional model to x-y coordinates and layer numbers, so that the layout data includes data for a plurality of microdevices.

Various aspects advantageously permit determining effective structures for desired microelectromechanical systems (MEMS). Various aspects advantageously reduce the time required to prepare a MEMS design for layout, and reduce the probability of introducing errors in the translation from design to layout.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIGS. 12A-C show a representation of the SugarCube interface for Sugar2GDSII as shown implemented using MATLAB;

Figure 1:
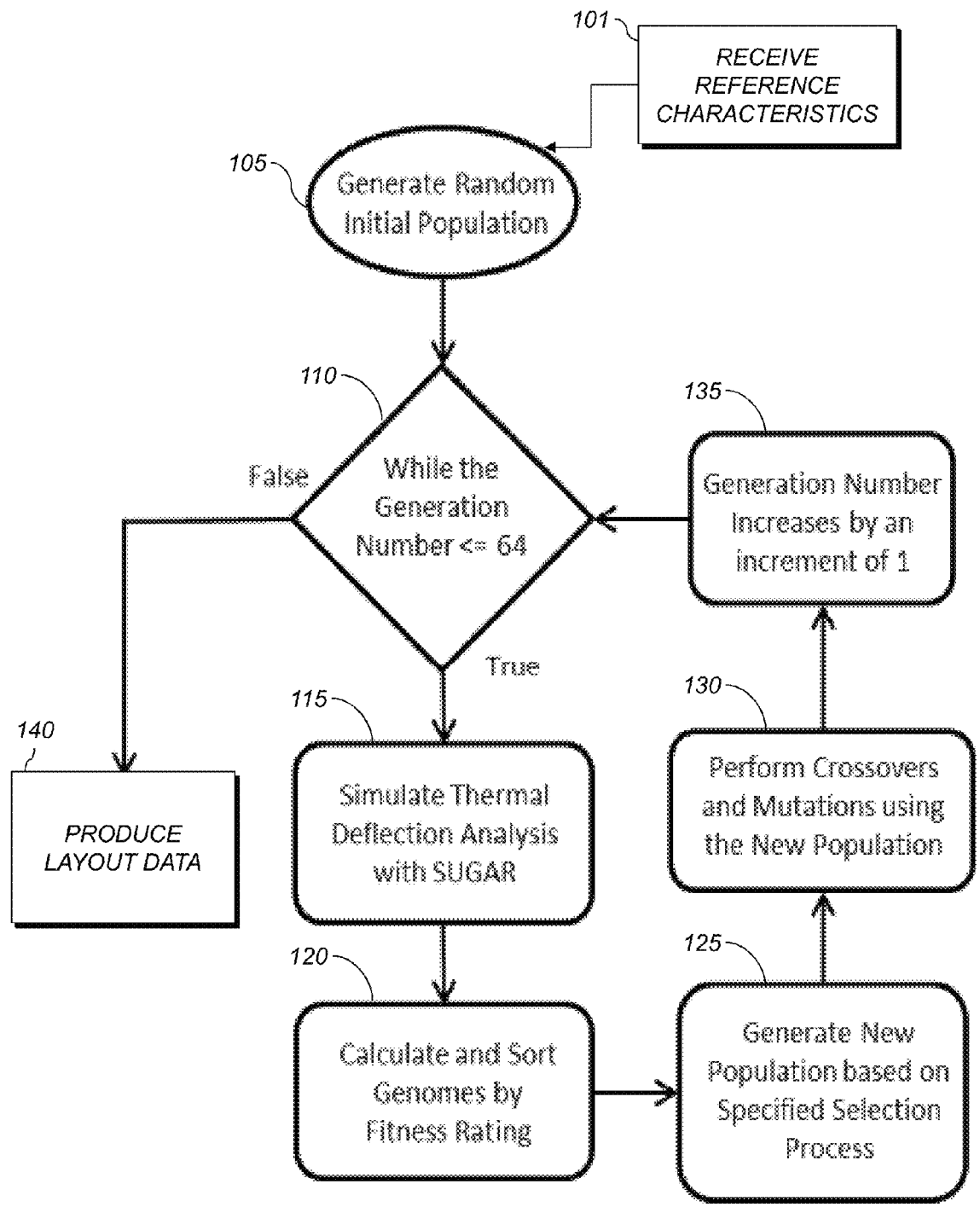
FIG. 1 is a flowchart of methods of using genetic programming to determine a desired output device according to various aspects.

The attached drawings are for purposes of illustration and are not necessarily to scale.

DETAILED DESCRIPTION OF THE INVENTION

Throughout this description, some aspects are described in terms that would ordinarily be implemented as software programs. Those skilled in the art will readily recognize that the equivalent of such software can also be constructed in hardware (hard-wired or programmable), firmware, or microcode. Accordingly, aspects of the present invention may take the form of an entirely hardware embodiment, an entirely software embodiment (including firmware, resident software, or micro-code), or an embodiment combining software and hardware aspects. Software, hardware, and combinations can all generally be referred to herein as a "service," "circuit," "circuitry," "module," or "system." Various aspects can be embodied as systems, methods, or computer program products. Because data manipulation algorithms and systems are well known, the present description is directed in particular to algorithms and systems forming part of, or cooperating more directly with, systems and methods described herein. Other aspects of such algorithms and systems, and hardware or software for producing and otherwise processing signals or data involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

The "e" form of scientific notation is used herein. For example:

$$42e5 = 42e+005 = 4.2e6 = 4.2 \times 10^6 = 4,200,000.$$

Various aspects relate to the production of microelectromechanical systems using genetic programming. As the functional requirements of MEMS devices become more complex, advanced optimization techniques become more useful in determining effective parameters, or even producing new components to satisfy a desired output. Various aspects provide these advantages using genetic programming (GP), a class of artificial-intelligence mathematical optimization techniques for determining parameters corresponding to a more preferred output.

The applications of genetic programming to MEMS have been mostly limited to the task of optimizing parameters and components for existing devices. In addition to these applications, GP can also be utilized to produce original MEMS devices. MEMS devices can also be derived to match the shape and structure of existing devices based solely on the device's performance characteristics. In various aspects, an electro-thermal actuator or a chevron actuator can be re-derived. In other aspects, structures for devices other than thermal actuators, and other types of electromechanical systems, can be defined using genetic programming.

Since the discovery of genetic programming, problems associated with optimization have been easily resolved through the use of computer programming Genetic programming can be applied to almost any field and for devices of any scale, for example, the nanoscale, microscale, or macroscale. The capability of a genetic program to re-derive MEMS components is an important step towards advanced functionality for MEMS devices.

Genetic programming has been utilized on a wide variety of applications within MEMS. Li and Antonsson have optimized the MEMS fabrication process by using genetic algorithms to modify the design of mask layouts [5]. MOGAs (Multi Objective Genetic Algorithms) along with SUGAR have been used to design the arms of a MEMS resonator [1, 2, 6, 7]. Bond graphs along with GP have been utilized to optimize RF MEMS devices [4]. Koza has worked with GP and SPICE to re-derive existing circuits, and demonstrated that genetic programs can produce circuits on their own [3].

Genetic programs determine a desired output through an algorithm based on Darwin's Theory of Evolution from a randomly generated initial population (step 105, FIG. 1). The algorithm is based on evolutionary processes such as natural selection, crossovers, and mutations and each "individual" (test case) in the population is represented by a genome, which is comprised of a set of genotypes. A genome is typically represented as vector or matrix with each entry in the vector corresponding to a specific genotype.

The natural selection process is represented as a feedback structure in which the best individuals in the population are determined based on a user specified fitness rating. A genetic program can be a single-objective genetic algorithm (SOGA) or a multi-objective genetic algorithm (MOGA). The fitness rating of a SOGA based GP is based solely on how close an individual comes to the desired output. For most MOGA based GPs, the equation of the fitness rating is typically constructed by a ranking system applied to each desired criterion [1, 7].

The crossover process can viewed as a reproduction process. When a child is formed, it takes a random half of genetic data from the father, and another random half from the mother's genes. A crossover occurs when one or multiple genotypes of two parents are exchanged to create a child or children [1].

A mutation can be represented as a randomly generated change to a genome or a specific genotype within a genome. When implementing a genetic program, a variety of ranges can be used for the mutation rate, e.g., as high as 70% or 1% [1, 6].

A GP includes a model of the genome. Since the goal of the genetic program according to various aspects is to re-derive an electro thermal actuator or a chevron actuator from an initial set of randomly generated structures, each genome represents an individual structure completely. In various aspects, each structure or device is composed entirely of a set of links, in which each link is attached to the end of the previous link. Each link's length, width, and angle, are included as genotypes, as well as the total number of links. Several other GPs have also modeled genomes using length, width, and angle as genotypes [1, 2, 5, 6, 7]. The electro thermal actuator and chevron actuator operate through a change in temperature, so a thermal deflection analysis is conducted on each structure to verify similar operation (discussed below). Due to this, each link's temperature is included as a genotype. The fitness rating and the number of the generation structure was created are also included as information within the genotype. A sample genome structure can be seen in Table 1:

deflections in the x, y, and z axis, and the rotation deflections about the x, y, and z axis at each node/link output. SUGAR has been used in previous GPs for MEMS optimization [1, 2, 6, 7]. MATLAB was used to generate each of each of the genomes, while in the process, verified that each structure followed the necessary boundary and overlap constraints. The overlap constraints were met through the use of an area placeholder within the structure generation program. This improves upon a previous design that avoided similar issues of link overlap by selecting all the links oriented outward [1]. Unlike the legs in that comparative design, the links' angles in this inventive simulation were able to point back inward if selected to do so. Each genome was then used to model each structure in SUGAR, and a thermal analysis and a corresponding deflection analysis were performed (step 115, FIG. 1).

Two sets of genetic programs were created to model the performance of the electro thermal actuator and the chevron actuator, respectively. The general process of each GP can be viewed within the flowchart in FIG. 1. Although both GPs are similar, there exist a few differences between the simulated thermo electric actuator model GP and the chevron model GP. Regarding step 125, FIG. 1, the chevron actuator model carries over only the newly created most fit children from the previous generation to be modified, while the thermal actuator model carries over the top ranking individuals collected in the overall pool.

TABLE 1

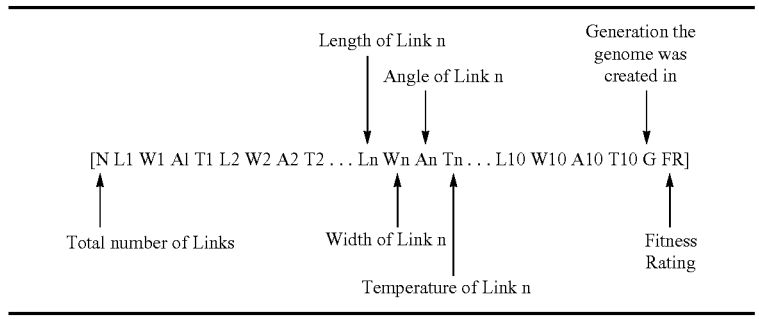

In one simulated example, several constraints were applied to each structure. The material in every structure was modeled as poly-silicon. All models were created to be planar within the x-y plane. Every link angle was constrained to be orthogonal. The number of total links in each device could vary from two to ten. Each structure was constrained to an area of 200 microns by 200 microns. In addition, none of the links could overlap, and each of the links had to maintain a 2 micron gap between itself and any other link. All links created within the chevron actuator GP were selected to have a 2 micron width, set to 600° C., and contain a varying length between 3 and 100 microns. When modeling the electro thermal actuator, each link had either a 2 micron or 20 micron width, with a varying link length between 12 and 1000 microns. The wide links of 20 μm length were set to a temperature of 300° C., and the thin links were set at 600° C. The temperature difference was used between the two links to ensure that the thermo-actuator model could simulate deflection realistically.

Figure 2:
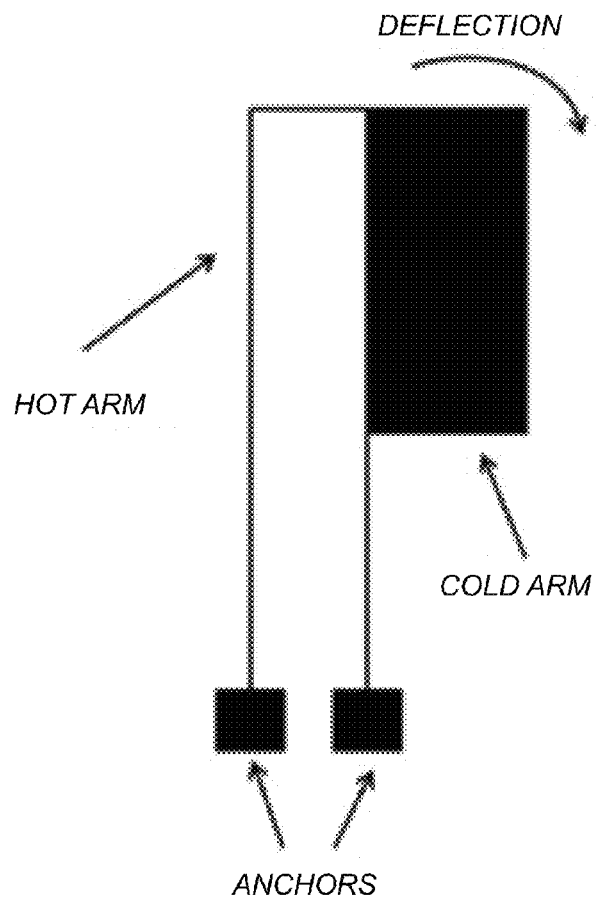
FIGS. 2 and 3 show deflection patterns of an electrothermal actuator and a chevron actuator, respectively.
Figure 3:
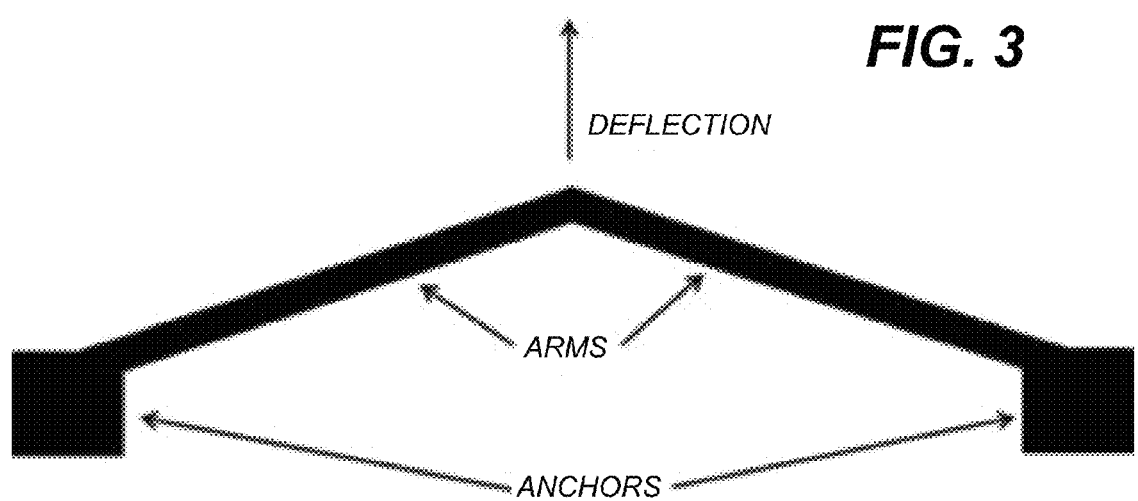

Each genome and corresponding structure were modeled and simulated through MATLAB and version 2.1 of SUGAR. Similar to SPICE's simulation and analysis of electronic circuits, SUGAR performs similar analysis on mechanical structures. SUGAR returns a vector of containing the linear The natural selection process is the most influential factor in developing a desired outcome. MOGAs were used for both cases, and a rank based fitness equation was applied to each structure (step 120, FIG. 1). The fitness equations are based on the deflection pattern of each actuator. The deflections of both actuators can be seen in FIGS. 2 and 3. The GPs selected the highest-ranking structure after a fixed number of iterations (decision step 110, FIG. 1).

Mutations and crossovers were applied within the same step (step 130, FIG. 1). If a crossover between two parents could not produce a child that met the modeling constraints within 100 attempts, two new parents were selected. 128 new children were created each generation. The genotype mutation rate was selected at 2% for the chevron actuator GP, and 2.5% for the electro thermal actuator GP.

The chevron actuator and thermo electric were successfully re-derived through the use of genetic programs. The GPs will not always produce the same result every time; however, they will produce something a structure that has the same displacement characteristics as the electro-thermal actuator or the chevron actuator.

Figure 4:
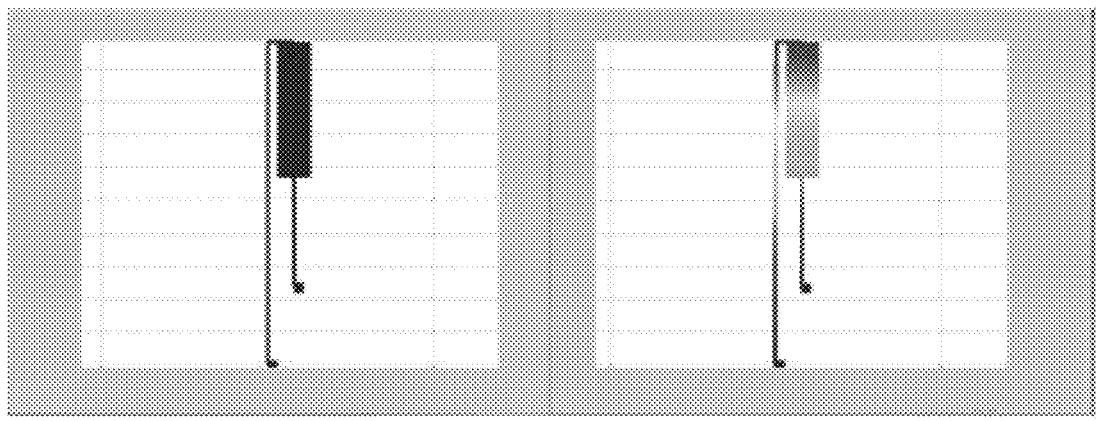
FIG. 4 shows a simulation of a reconstructed electrothermal actuator.

Both programs converged to a common solution after a certain number of intervals. The GP re-derived the electro thermal actuator in the 29th generation. The simulated reconstructed electro thermal actuator can be seen in FIG. 4. Plot 410 shows the structure and plot 420 shows the structure as deflected under given thermal conditions. Plots 410 and 420 have abscissa X (horizontal [m]), with gridlines at −1e-4, 0, 1e-4; and ordinate Y (vertical [m]), with gridlines at 0, 2e-5, 4e-5, . . . , 18e-5. Plot 420 shows total displacement [m]. The legend next to plot 420 extends from 0 to 10e-7.

Figure 5:
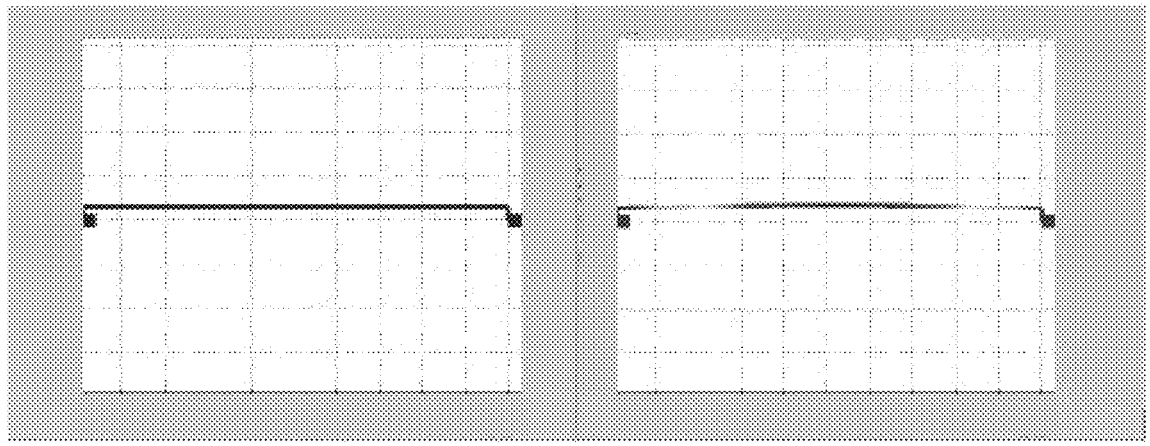
FIGS. 5 and 6 show simulations of reconstructed symmetric and asymmetric chevron actuators, respectively
Figure 6:
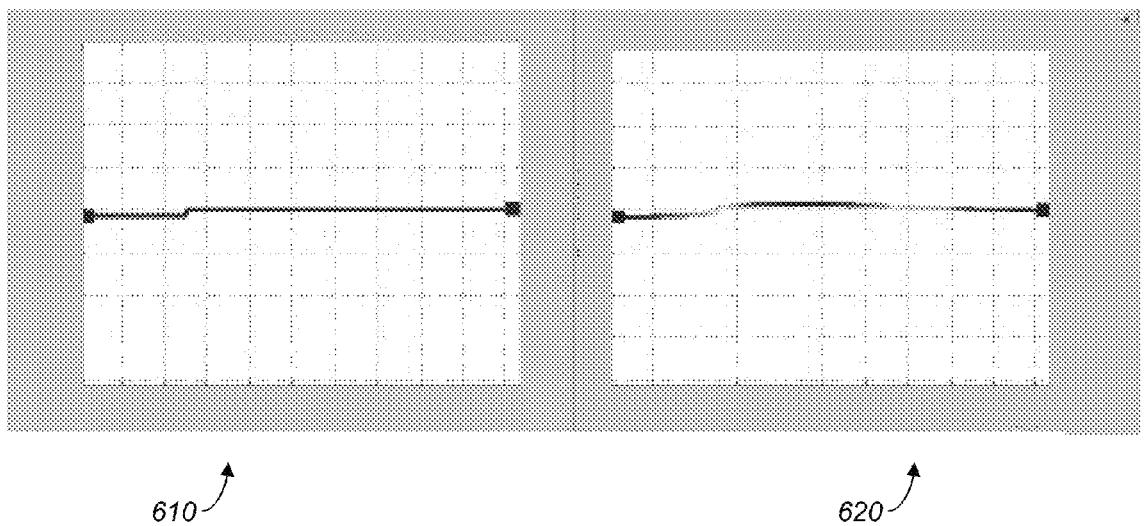
Figure 7:
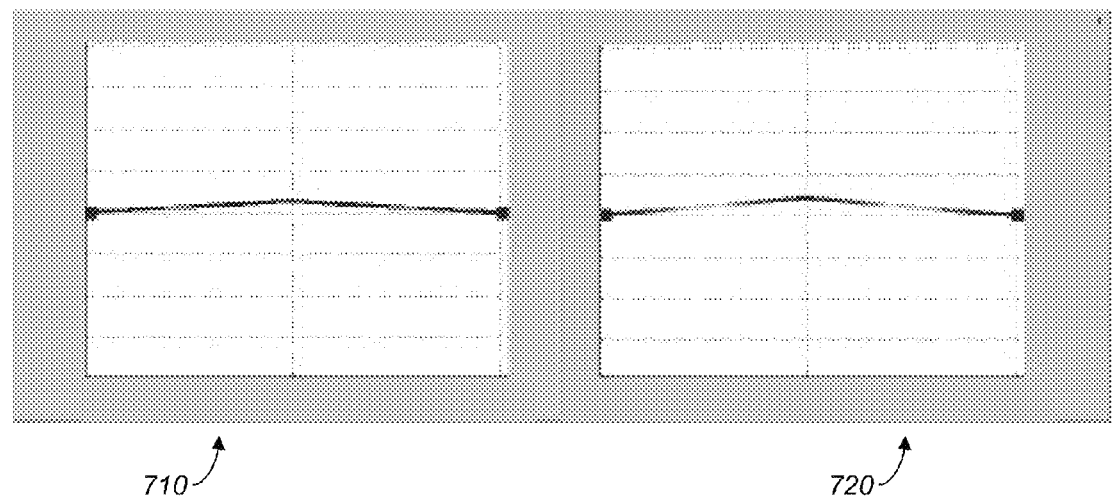
FIG. 7 shows a simulation of a reference chevron actuator.

The chevron actuator was tested with both symmetric constraints on and off. The asymmetric chevron actuator was re-derived within the 18th generation without constraints, and in the 9th generation with symmetric constraints. Since the actual chevron resonator is not orthogonal, the program (with orthogonally-constrained links, as discussed above) could not mimic the device exactly, however both solutions perform similarly with respect to change in deflection. The solutions for both cases can be seen in FIG. 5 (symmetric; plot 510 structure and plot 520 deflection) and FIG. 6 (asymmetric; plot 610 structure and plot 620 deflection). As a comparison, an ideal chevron actuator is shown in FIG. 7 (plot 710 structure and plot 720 deflection). Plots 510 and 520 have abscissa X (horizontal [m]), with gridlines at −18e-5, −16e-5, . . . , −2e-5, 0; and ordinate Y (vertical [m]), with gridlines at −6e-5, −4e-5, −2e-5, 0, 2e-5, 4e-5, 6e-5, 8e-5. Plot 520 shows total displacement [m]. Plots 610 and 620 have abscissa X (horizontal [m]), with gridlines at −18e-5, −16e-5, . . . , −2e-5, 0; and ordinate Y (vertical [m]), with gridlines at −8e-5, −6e-5, −4e-5, −2e-5, 0, 2e-5, 4e-5, 6e-5. Plot 620 shows total displacement [m]. Plots 710 and 720 have abscissa X (horizontal [m]), with gridlines at 0, 1 e-4, 2e-4; and ordinate Y (vertical [m]), with gridlines at −6e-5, −4e-5, −2e-5, 0, 2e-5, 4e-5, 6e-5, 8e-5. Plot 720 shows total displacement [m]. The legend next to plot 520 extends from below 0e-7 to above 12e-7. The legend next to plot 620 extends from 0 to above 2.5e-6. The legend next to plot 720 extends from 0 to above 2e-6.

Using genetic programming techniques, not only is it possible to derive new devices, the GP itself can re-derive already-existing devices from evolving a large group of randomly shaped devices. Unlike results obtained by previous efforts, the MEMS obtained through this method are able to actuate, have been shown to be useful, and are amenable to conventional fabrication [1, 2, 6, 7].

In various aspects, in step 101, reference actuator performance characteristics are received. In step 140, using the controller, the layout data are produced corresponding to the geometric properties in the one of the structure genotypes.

Figure 26:
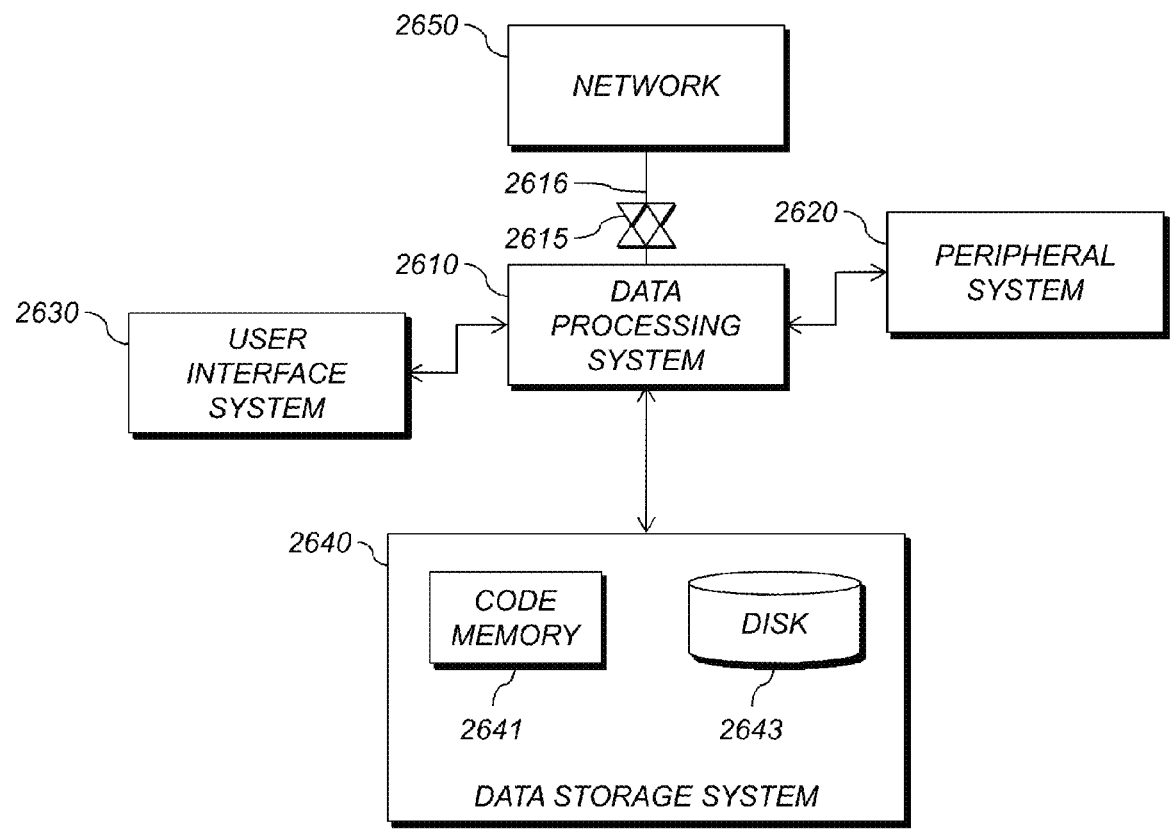
FIG. 26 is a high-level diagram showing components of a data-processing system.
Figure 27:
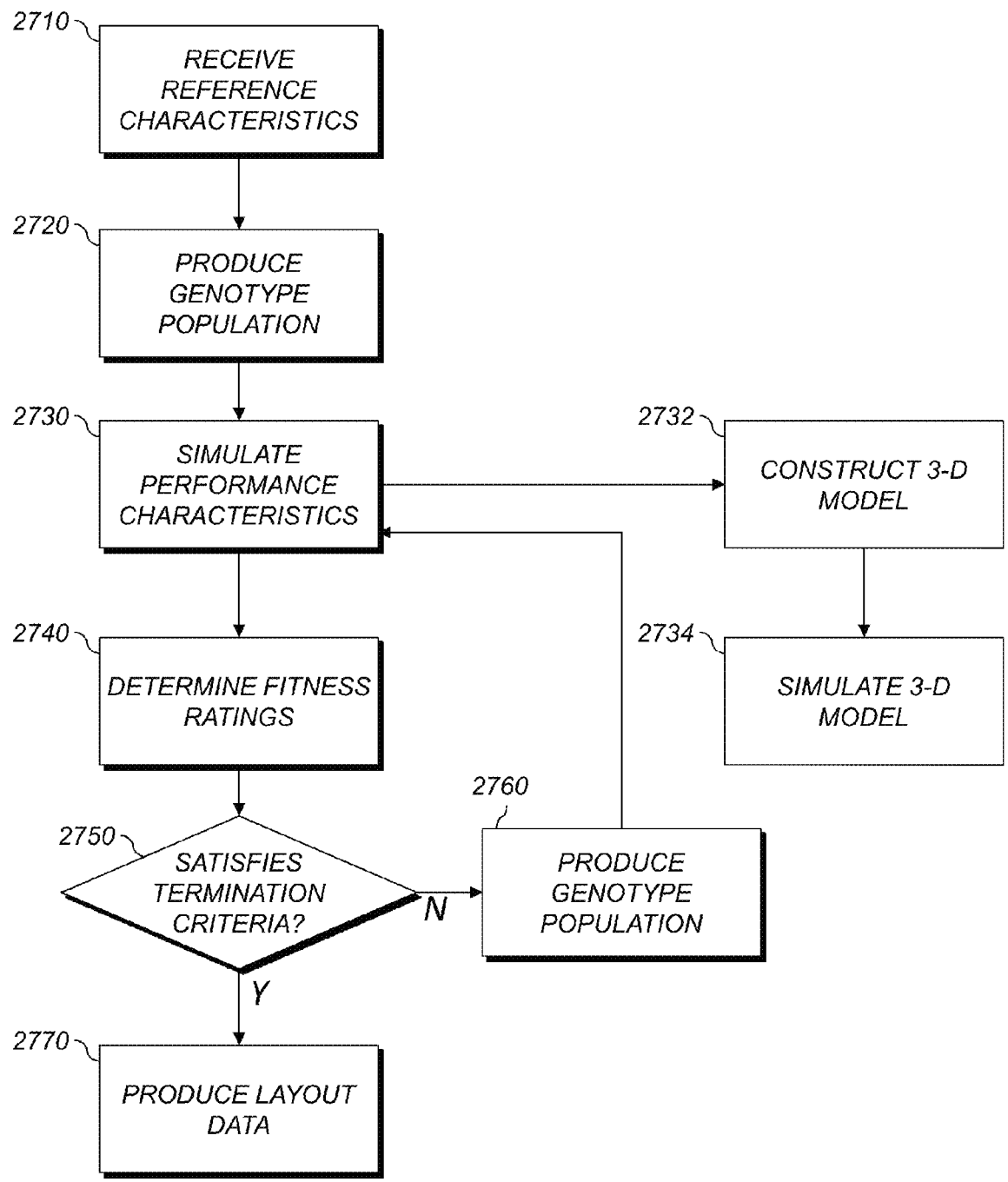
FIG. 27 shows methods for producing layout data corresponding to a thermally-operated actuator according to various aspects.

FIG. 27 shows methods for producing layout data corresponding to a thermally-operated actuator according to various aspects. Steps of the method are automatically performed using a controller, e.g., data-processing system 2610 (FIG. 26). Processing begins with step 2710.

In step 2710, reference actuator performance characteristics are received (e.g., the desired deflection for the actuator). Step 2720 is next.

In step 2720, a first population of structure genotypes is automatically produced. Each structure genotype includes geometric and thermal properties of each of a plurality of links in the thermally-operated actuator. Each of the structure genotypes can completely represent a structure of an actuator. The geometric and thermal properties selected are randomly, e.g., pseudo-randomly. Step 2730 is next.

The geometric properties can include length, width, and angle. The thermal properties can include link temperature. In various aspects, structure genotype further includes material properties of each of a plurality of links. The material properties can include one or more properties selected from the group including temperature, Young's modulus, electrical conductivity, thermal conductivity, thermal expansion coefficient, capacitance, piezoelectric constant, density, viscosity, heat capacity, inductance, permittivity, permeability, residual stress, and strain.

In step 2730, respective actuator performance characteristics of each of the structure genotypes in the first population are simulated. This is as discussed above; see, e.g., simulation results 420, 520, 620, 720 in FIGS. 4-7 respectively. In various aspects, simulating step 2730 includes step 2732 of constructing a respective three-dimensional model for each of the structure genotypes using the corresponding geometric properties and step 2734 of performing a static simulation of the respective three-dimensional model under conditions specified by the corresponding thermal properties. Step 2730 is followed by step 2740.

In step 2740, a respective fitness rating of each of the structure genotypes in the first population is determined by comparing the simulated actuator performance characteristics to the reference actuator performance characteristics. The respective fitness rating can be a ranking. Decision step 2750 is next.

In decision step 2750, it is determined whether one of the structure genotypes satisfies selected termination criteria. If so, step 2770 is next. If not, step 2760 is next.

In step 2760, a second population of structure genotypes is produced using the first population and the determined fitness ratings. This can include mutating first selected one(s) of the first population and performing crossovers among second selected one(s) of the first population.

Step 2760 is followed by step 2730. In this way, the simulating, determining-fitness-rating, and producing steps are iterated using the second population in place of the first population until one of the structure genotypes satisfies the selected termination criteria. For example, iteration can occur for a selected number of iterations (e.g., decision step 110, FIG. 1).

In step 2770, the layout data corresponding to the geometric properties in the one of the structure genotypes are automatically produced using the controller.

Various aspects relate to an online CAD tool for the parametric exploration of ready-made MEMS. An online micro electromechanical systems (MEMS) design tool can be executed on a programmed computer using a program called Sugar2GDSII for simulating and laying out parameterized arrays of a reference microdevice. The tool can be integrated in the MEMS simulation tool (program) called SugarCube, which can be executed on the programmed computer. The reference device can be selected from a library of ready-made systems, or new devices can be imported from the Sugar tool. Various aspects of SugarCube tool facilitate design and exploration by novice users. Various geometric, material, and drive parameters can be swept over design-rule ranges by using sliders. One- or two-dimensional layout arrays can be grounded to common bonding pads through automatically generated tracers and pads. Automatic features such as etch holes or multi-layer bonding pads can be produced. The layout output can be in GDS-II format. Design rules for, e.g., the MEMSCAP, S.A. PolyMUMPs or SOIMUMPs multi-layer MEMS fabrication processes can be defined. Static, model, or transient analysis of the array of devices by SugarCube can be performed, resulting in a value, 2D curve, or 3D plot manifold. Such automated features can reduce the time that many designers might otherwise spend on manually laying out parameterized arrays of MEMS. Time can be reduced from days to minutes in some aspects.

In a MEMS design cycle, layout generation is an important and potentially time-consuming stage. Mistakes can be costly in terms of failed fabrication runs and lengthy turnaround times. Especially when the layout has multiple features like etch holes, tracing lines, multilayer bonding pads, or other features, the probability of making a mistake cannot be overlooked. Various prior schemes use layout software tools (e.g., L-EDIT, or CADENCE) that can automatically generate features that might be needed in an IC layout. Conventionally, MEMS designers used these software tools from the electronics industry to generate their layouts. Although these tools provide many features, they are not specific to the needs of MEMS designers, making the layout process tedious and time consuming. With the evolution of the MEMS field, specialty-CAD-for-MEMS tools have also evolved very quickly. Various schemes use tools like COVENTORWARE, INTEL-LISENSE, softMEMS, or NODAS, which can automatically generate layout from MEMS model. But these software tools have limitations in that they cannot readily automate the generation of parameterized arrays of devices, connecting tracers, ground planes, or other features. Although some software tools can be extended to generate such features, such tools have advanced operating instructions, requiring users to develop complicated scripting code.

Various aspects described herein address the above-identified needs, e.g., for MEMS novices. These capabilities can be embodied in a tool, e.g., called Sugar2GDSII. Various aspects automatically produce a layout for a MEMS device or an array of devices from a Sugar netlist. The layout output file can be in GDS-II format and can adhere to a set of design rules required for a fabrication process (e.g., SOIMUMPS). Features such as etch holes, multilayer bonding pads, or tracers can be automatically added to the layout, e.g., upon the user's request. Various aspects are embodied in tools that can be accessed through a web browser, e.g., tools hosted at the nanoHUB such as SugarCube. In various aspects (e.g., using SugarCube), the user first loads a reference MEMS device from a library of systems, then modifies its parameters using design-rule limited sliders, i.e., input parameter adjustment tools. Based on the desired parameters to sweep, the new design modifications may be either simulated for performance exploration or laid out for fabrication, e.g., with a single button click.

A GDSII file is a standard stream format description of 2D layout data. It contains hierarchy of structures, with each structure containing the information of layout elements in the form of records. The layout can have different layers with the layer number of each element specified as parameter. As GDSII file is in stream format (binary), it is platform independent. When opened in a GDSII viewer, the viewer converts this stream format into local platform datatype. A text representation of GDSII format is also available, called ASCII format. This format is easily readable and helps the designer to understand the layout and make any modification, if necessary. Conversion from ASCII text format to stream format is done using standard binary to stream conversion process. Information in a GDSII file is stored as sequential set of records. These records store the details such as layer number, x-y coordinates of each polygon described in the layout, or datatype of coordinates. Various aspects described in this paper convert the nodal coordinates of Sugar elements into x-y coordinates of GDSII polygons and stores them in the record format.

Figure 8:
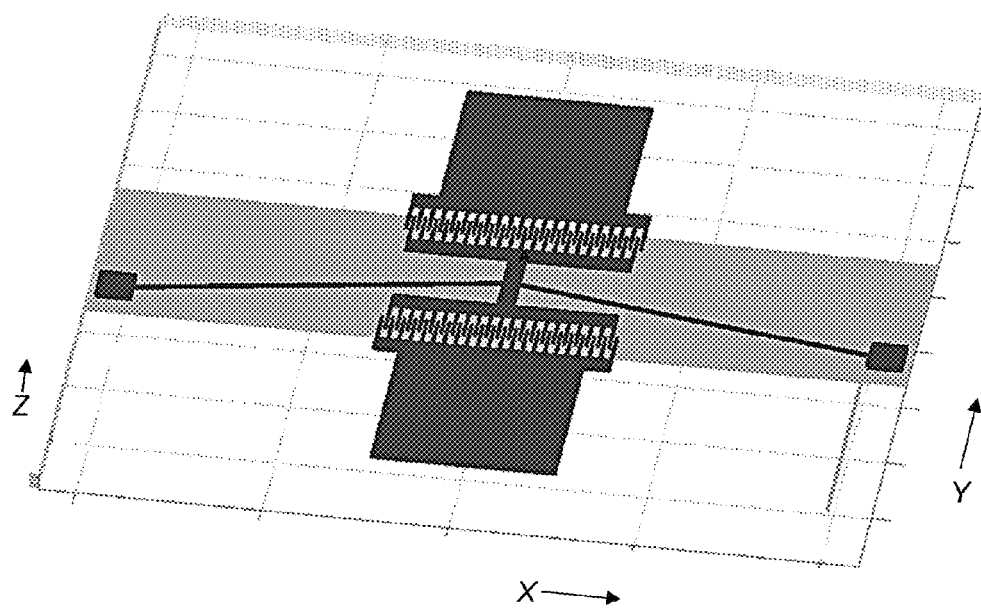
FIG. 8 shows a design of an electrothermal sensor.

Programs according to various aspects (e.g., Sugar2GDSII) generate the x-y coordinates of all the vertices of every element in the a Sugar netlist and inserts them in the GDSII file in the form of a record with information including, e.g., layer number, data type of x-y coordinates, or x-y coordinates themselves. See FIGS. 8, 9. FIG. 8 shows a design of an electrothermal sensor as shown in SugarCube. X increases to the right (horizontal [m], gridlines at −2e-4, −1e-4, 0, 1e-4, 2e-4). Y increases up (vertical [m], gridlines from −1.5e-4 to 2e-4 by 0.5e-4). Z (out of plane [m]) increases out of the plane shown. The range of Z shown is from −4e-6 to 4e-6 by 2e-6.

Figure 9:
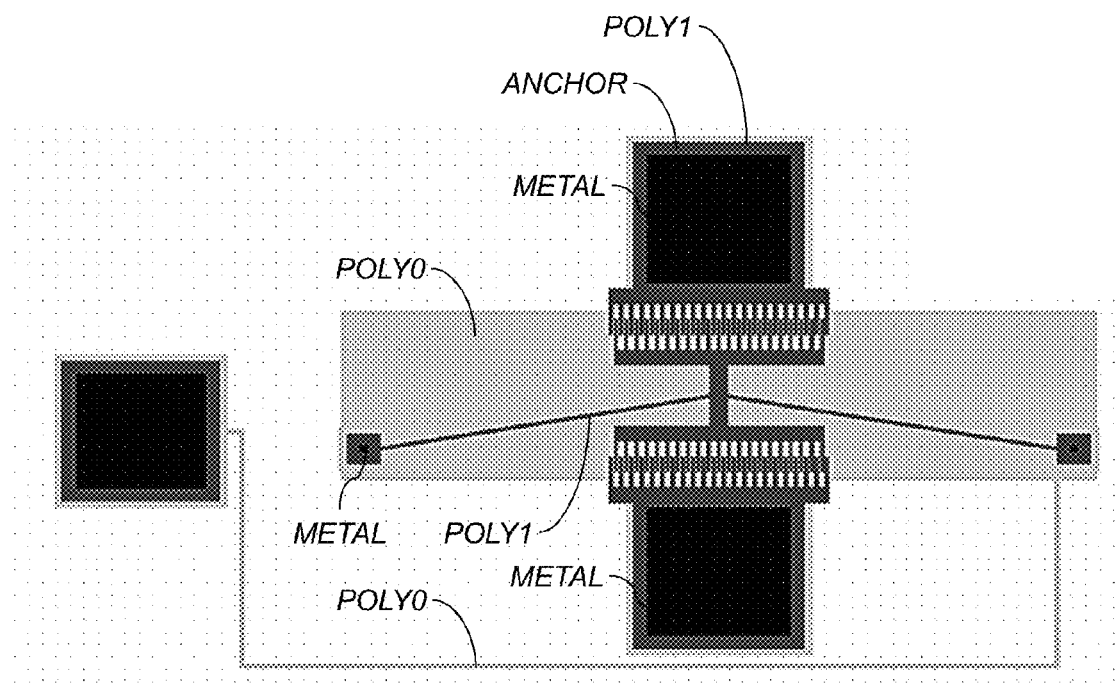
FIG. 9 shows a simulated layout corresponding to the design of FIG. 8.

FIG. 9 shows the layout generated by Sugar2GDSII for the design of FIG. 8, with layers identified (POLY0, ANCHOR, POLY1, METAL; an ANCHOR2 layer can also be used). XY-coordinates can be generated from the node information that is extracted from Sugar netlist. Additional information useful for a GDSII layout file can be specified as parameters in the netlist. For example, if there is a feature in the layout that has to be released in the fabrication process, the parameter release=1 can be supplied to the program, e.g., by the user, and Sugar2GDSII can automatically identify this value and generate the features required to release the structure. Once the GDSII ASCII file is generated, it can be converted to stream format using binary to stream conversions. GDSII stream files can also be generated directly.

Automatic features that can be generated by Sugar2GDSII are now discussed. Features discussed below can be designed to conform to standard design rules of a process like Poly-MUMPs or SOIMUMPs.

Figure 10:
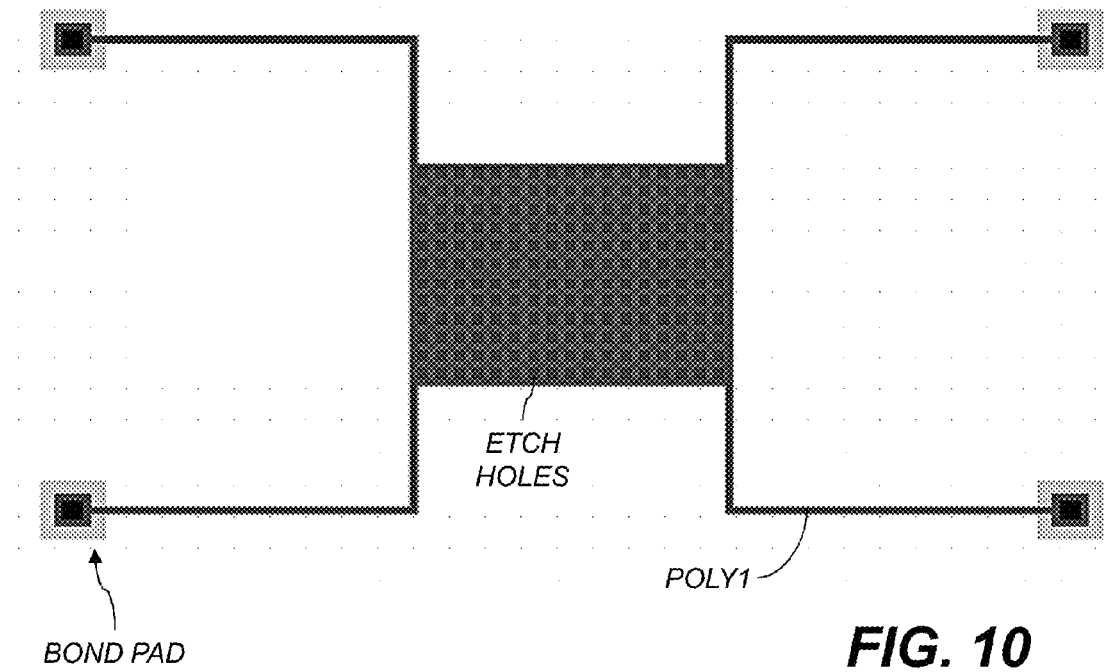
FIG. 10 shows a structure with automatically-generated etch holes.

Sugar2GDSII can automatically generate etch holes in a given layout. These etch holes can be useful for proper release of an oxide layer underneath a device layer. Generally, drawing etch holes in a layout is a time consuming process. Any small error could lead in device that is not released. Sugar2GDSII's automatic etch hole generator can address these problems. To achieve this, those structures that need to be released are identified, e.g., by a user specification. This identification can be specified in the element parameter as release=1 in the netlist. Sugar2GDSII identifies these elements and automatically decides if the etch holes are required or not. E.g., in case of SOIMUMPS, if the dimensions of a structure to be released are less than a specific tolerance, no etch holes are required. Such structures will be released when exposed to an etchant. This type of information is specified in a process file that can be input to Sugar2GDSII or other tools embodying various aspects described herein. If Sugar2GDSII determines that etch holes might be required, then they can be automatically generated. FIG. 10 shows a structure with automatically-generated etch holes. The etch holes are shown as small squares on the center mass of the crableg flexure of this GDSII file. The dimensions of these etch holes adhere to specified design rules.

Figure 11:
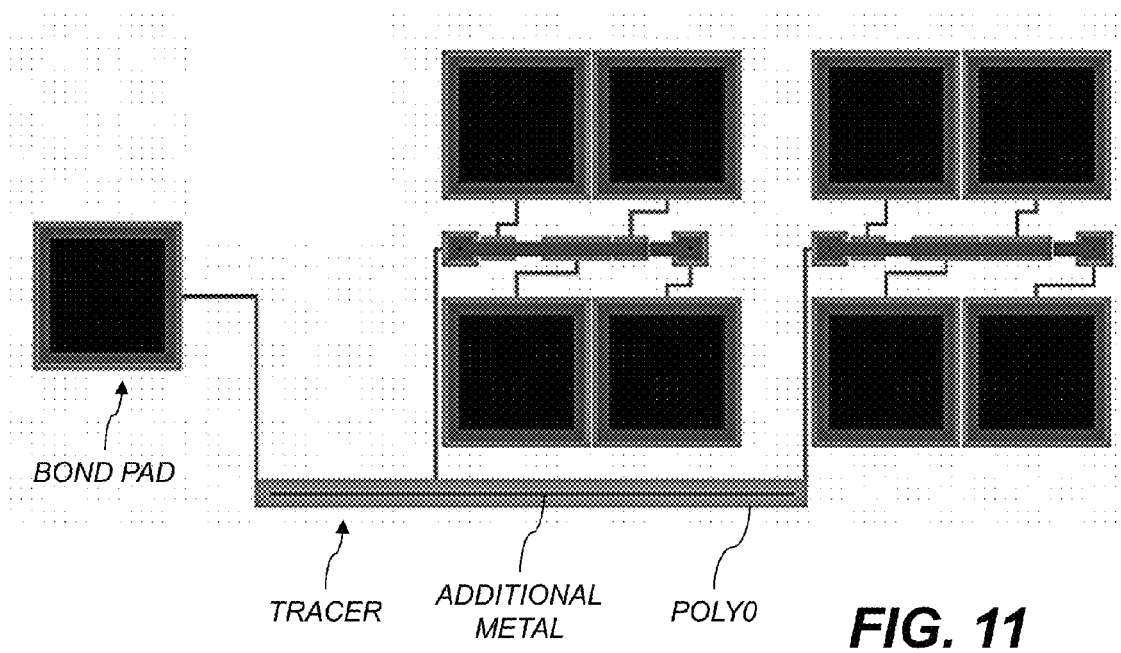
FIG. 11 shows a structure with automatically-generated common-voltage tracers.

Various aspects described herein, e.g., Sugar2GDSII, can automatically generate multilayer bonding pads (or anchors) and common-ground pads that are often used in multilayer fabrication processes like PolyMUMPs. Such multi-layered bonding pads are able to connect to any other structural layer in the process. They are topped by a metal layer for wire bonding or probing. Design rule layer size specifications for bonding pads are specified in the Sugar process file. FIGS. 10 and 11 show examples of the multilayer bond pad that were created in Sugar2GDSII, and imported into a free GDSII file viewer called CLEWIN.

Referring to FIG. 11, various aspects can automatically configure common voltage tracers from each device in an array to a shared bond pad. This can be useful for providing a common ground between a multitude of devices. Such tracers can advantageously reduce chip real estate by reducing the need for a large ground pad for each device. Such tracers can also advantageously decrease the time to probe device arrays, by requiring the re-positioning of only one probe instead of two probes when moving between devices. Common ground tracers can also advantageously reduce the probability of undesirable voltage loops; this can be helpful for, e.g., side by side comparisons of actuators. An example of automatically-generated tracers attached to a common ground is shown in FIG. 11. The automatically-generated tracers are connected to a common ground ("BOND PAD"). The tracers are designed in, e.g., the poly0 layer of a PolyMUMPs process. The tracers from each device in an array connect to a common ground pad (far left). Also shown is an additional metal layer on the tracer that is provided for increased conductivity.

Various aspects, e.g., Sugar2GDSII, can readily generate parameterized layout arrays of MEMS. Designers often layout an array of devices with slightly varying dimensions. This is often done to explore the dependence of particular design parameters on performance, or determine, e.g., the limits of linearity or limits of fabrication. With conventional CAD, changing the dimensions of complicated device geometries can be difficult. Prior schemes can require the designer to recreate large portions of the design configuration, which can be tedious and error prone. If a large, varying array of devices is configured, several hours to days may be spent on designing, debugging, and re-designing before the array is ready for layout submission. Various aspects described herein permit the user to reduce this time to seconds or minutes. In addition, tools according to various aspects can simulate the entire array and plot the performance manifold, or optimize the design for to achieve a particular performance metric such as resonance frequency.

In an example, to create a layout, the user loads a reference device and selects which parameters to modify along the rows and columns of the array, and the step size of parameter change. The parameters can be, e.g., the number of comb fingers or the gap between the fingers, the orientation of the device or the size of the proof mass. If a variation of the design is not already in the library, a new device may be configured using Sugar and easily imported into SugarCube. Upon clicking the Layout button, Sugar2GDSII automatically generates an array of devices with required bonding pads, etch holes, and tracers that connect to a common ground.

Figure 12A:
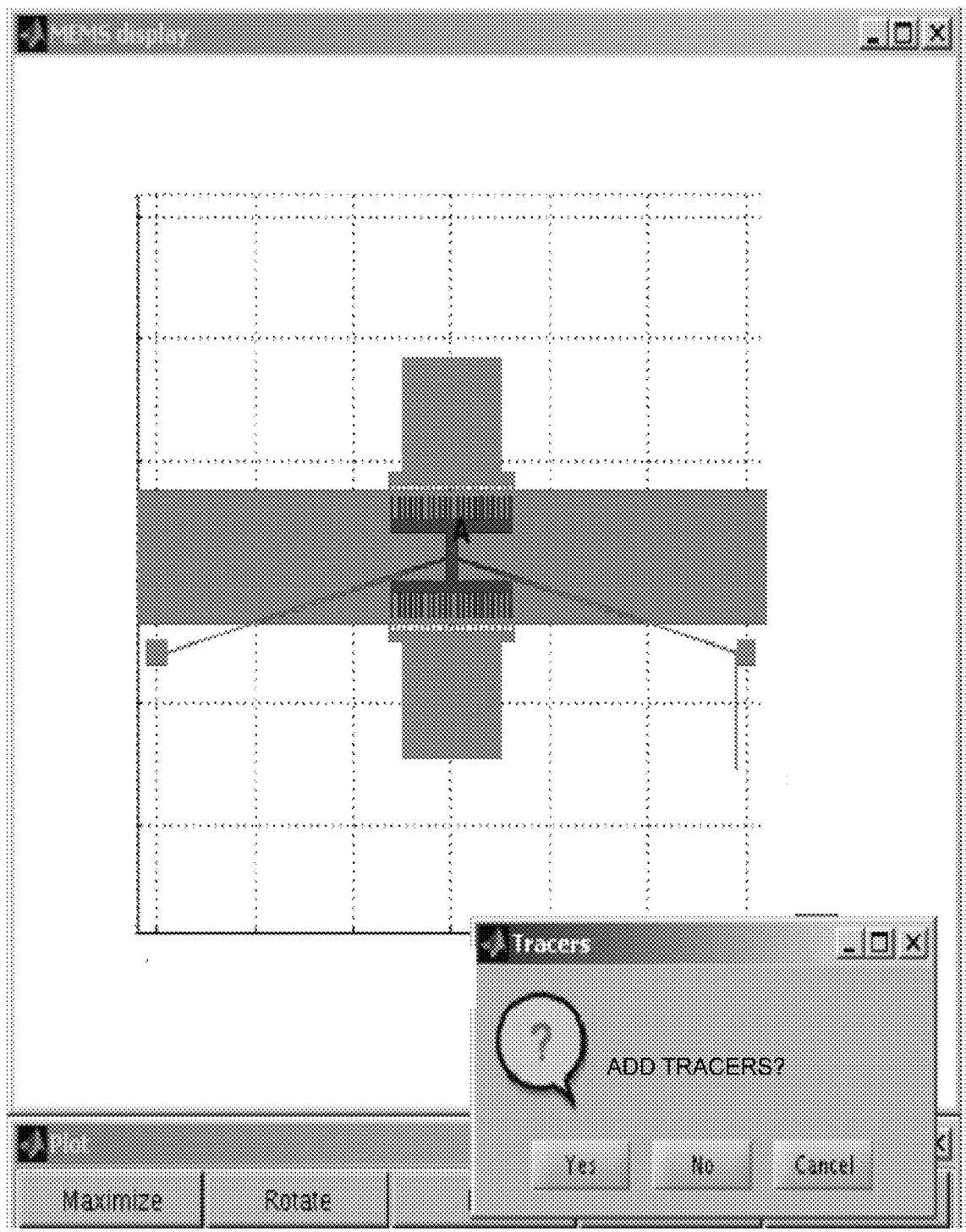
Figure 12B:
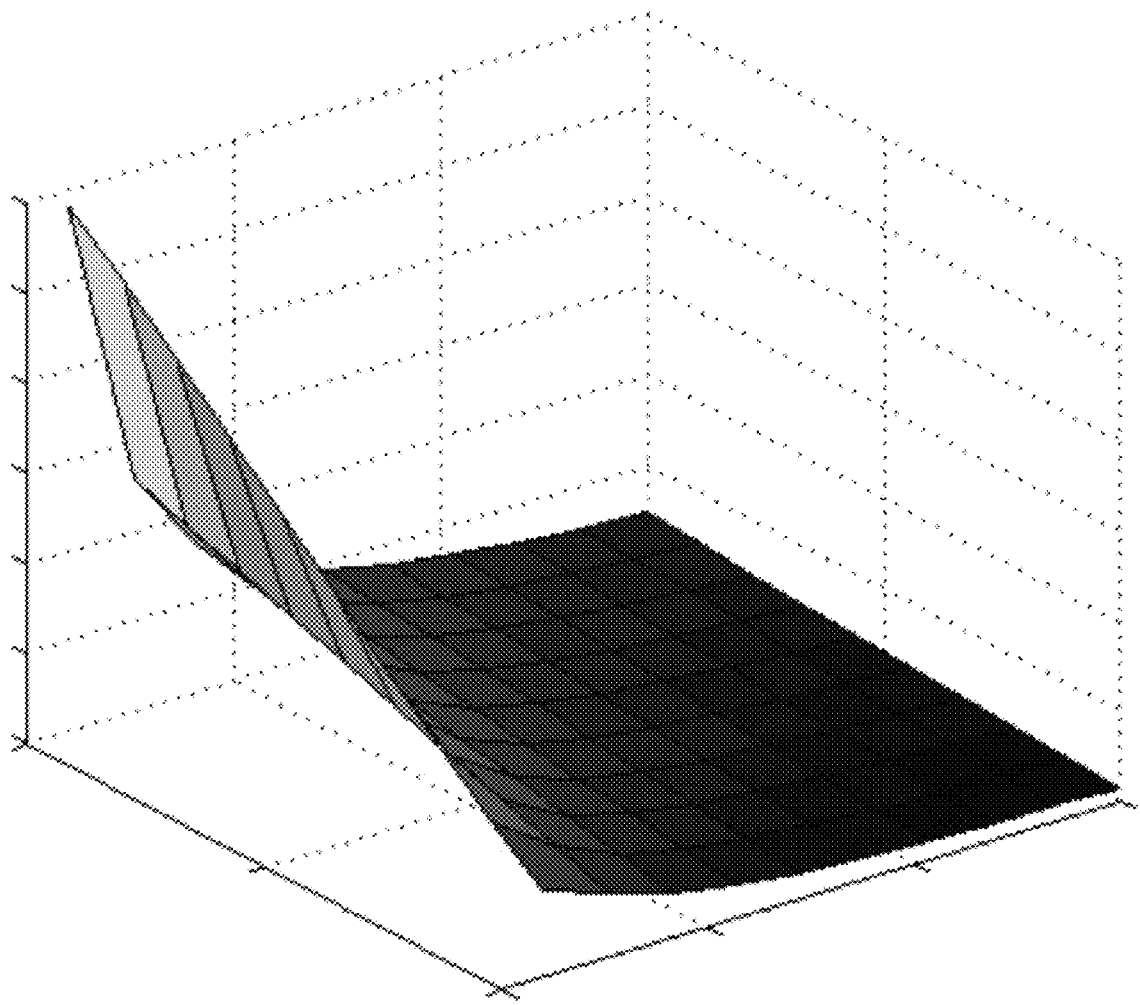
Figure 12C:
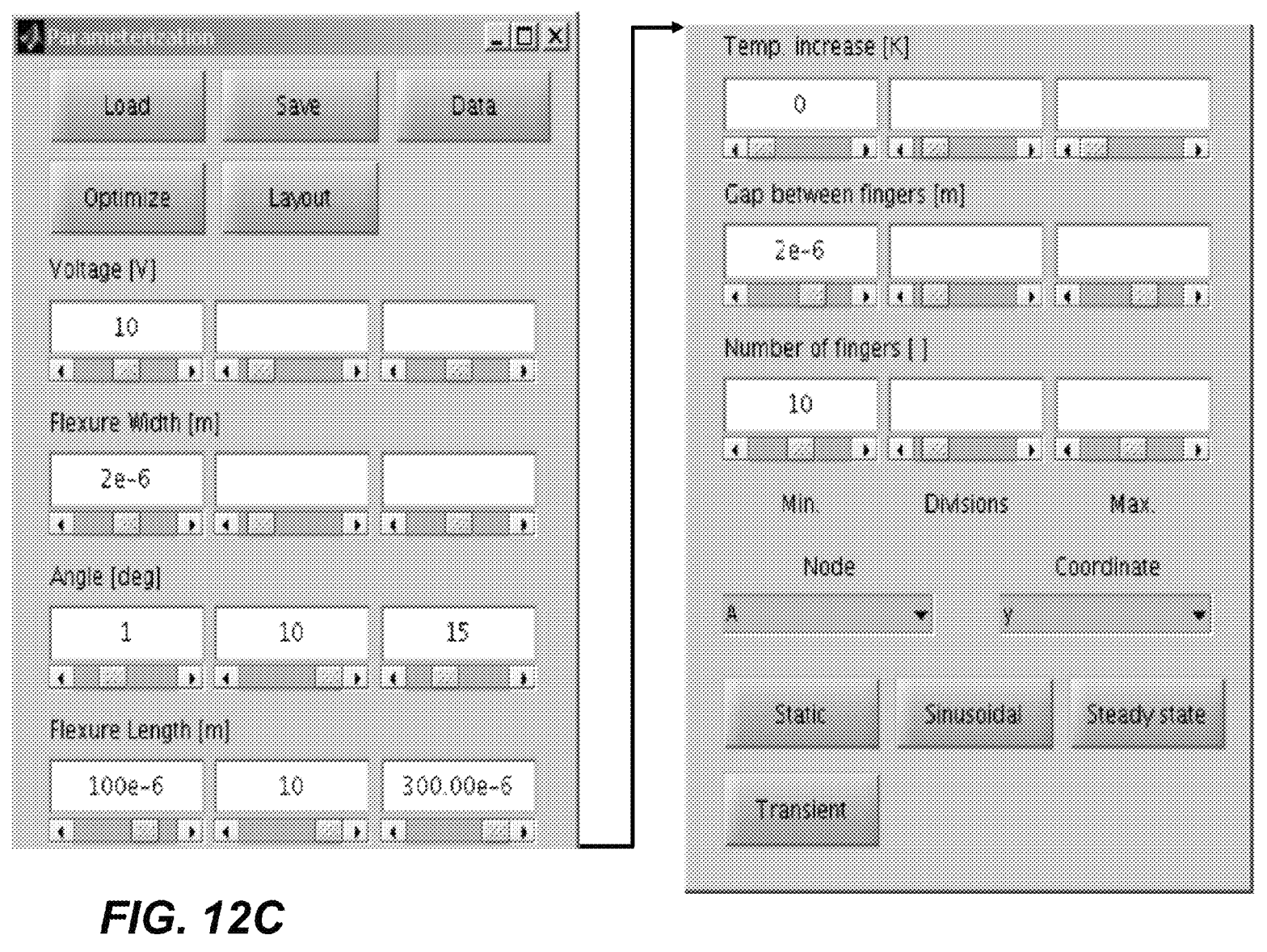

FIGS. 12A-C show a representation of the SugarCube interface for Sugar2GDSII as shown implemented using MATLAB. The right window (FIG. 12C) includes file controls, parameter options, and simulation options. The upper left window shows the deflected structure (FIG. 12A), which may be rotated in 3D. The lower left window (FIG. 12B) shows the result of pressing the Static simulation button. The features shown here are also what can be seen, e.g., in a deployed, online version, e.g., on the NANOHUB Web site at nanohub dot org.

In FIG. 12A, the X axis shows horizontal position. The Y axis shows vertical position [m] and has gridlines at −2e-4 to 3e-4 by 1e-4. The plot shows total displacement [m]. The legend extends from below 1e-7 up to about 9e-7.

Referring to FIG. 12C, the right window includes file management controls, followed underneath by selected parameters; those parameters that are displayed for the user are chosen in the netlist. For clarity, this window, which can be displayed as a single column, is shown split as indicated by the bent arrow. Although, in various aspects, every parameter of the design can be modified, usually the user will find the most helpful parameters of the design appear in this window. Default parameters are initially given; however, the user is able to change one or all parameters. Parameter values may be changed using a numeric pad or by dragging the slider. Parameters remain constant during simulation or layout if only the leftmost column is filled in. If the middle (division) column and rightmost (max value) are filled in, then that particular parameter will be swept during simulation or layout. In various aspects, a maximum of two parameters can be swept. Once parameters are chosen, an array can be laid out by pressing the Layout button, or various simulation options can be investigated.

The lower left window (FIG. 12B) shows a result of a static simulation in which various parameters were swept. Flexure length [m] was swept from 1e-4 to 3e-4 (center toward left), gridlines every 1e-4. Angle in degrees was swept from 0 to 15 (center to right), gridlines every 5°. The result was simulated displacement [m], on the vertical axis, from 0 to 1.2e-5, gridlines every 0.2e-5. The window can provide controls for manipulating the plot, e.g., "Maximize" or "Rotate" buttons.

Figure 13:
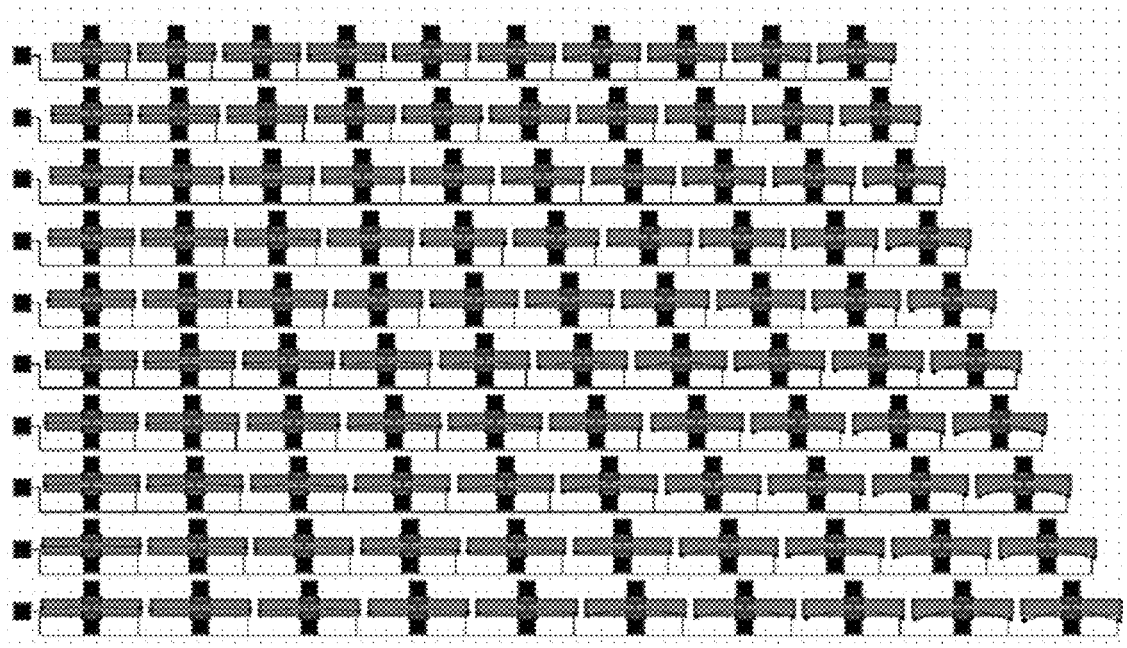
FIG. 13 shows a simulated layout array corresponding to the structure shown in FIGS. 12A-C.

FIG. 13 shows the layout array corresponding to the structure shown in FIGS. 12A-12C, i.e., the layout produced as a result of the user's pressing the Layout button (FIG. 12C). The bond pads of the produced devices may be aligned vertically and horizontally to facilitate automated probing, or the devices may be positioned closely in a nonrectangular array (as shown in FIG. 13) to conserve chip real estate. By loading a ready-made MEMS configuration into SugarCube, a novice user can easily manipulate sliders to specify parameters value for layout and or simulation. The resulting GDSII file image shown here was captured using the free CLEWIN layout viewer.

Figure 14:
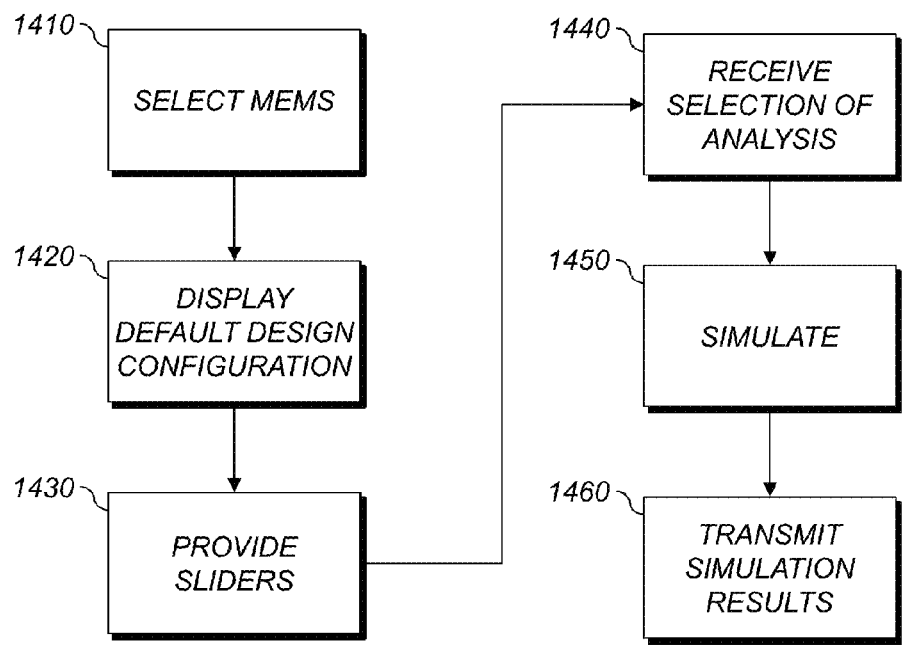
FIG. 14 is a flowchart of ways of simulating MEMS devices according to various aspects.

Referring to FIG. 14, according to various aspects, a tool based on a programmed computer, e.g., an online tool, called SugarCube greatly simplifies the parametric exploration of ready-made micro electro mechanical systems (MEMS). The tool can be made available online. The programmed computer can interact through a server interface with a web browser. A program-specific library installed on a computer can include a plurality of parameterized MEMS, e.g., based on those reported in the literature. Upon selecting a MEMS to explore (step 1410), the programmed computer can display a default design configuration in a first window (step 1420), while sliders for modifying design parameters are provided by the programmed computer in a second window (step 1430), e.g., design-rule limited sliders as discussed above. Static, modal, steady state, or transient analysis can be selected (step 1440), i.e., a selection of an analysis can be received from the user by the program. Upon simulation (step 1450), 3D images of the deflected device with circuit elements, or response curves, can be displayed by the programmed computer and transmitted, e.g., through the web interface in a third window (step 1460). Compared to conventional tools, SugarCube can be significantly easier, faster, and more accessible for performing the aforementioned features. SugarCube can be operated by users without expertise in MEMS or users without manuals for computer aided design and engineering (CAD).

A software tool according to various aspects is executed on a programmed computer and can be used locally or online for both simulating and laying out readymade MEMS. The tool can be amenable to use by novices and may reduce the time that many expert MEMS designers usually spend on design. Some of the tedious and time-consuming aspects of layout can be replaced by automated processes in the tool according to various aspects. These procedures can include new advances such as coupled parameterized simulation and layout arrays, and automatically-generated common ground tracers. Other provided procedures can include automatically-generated etch holes, anchor and bonding pad layers, and backside etch layers.

Figure 28:
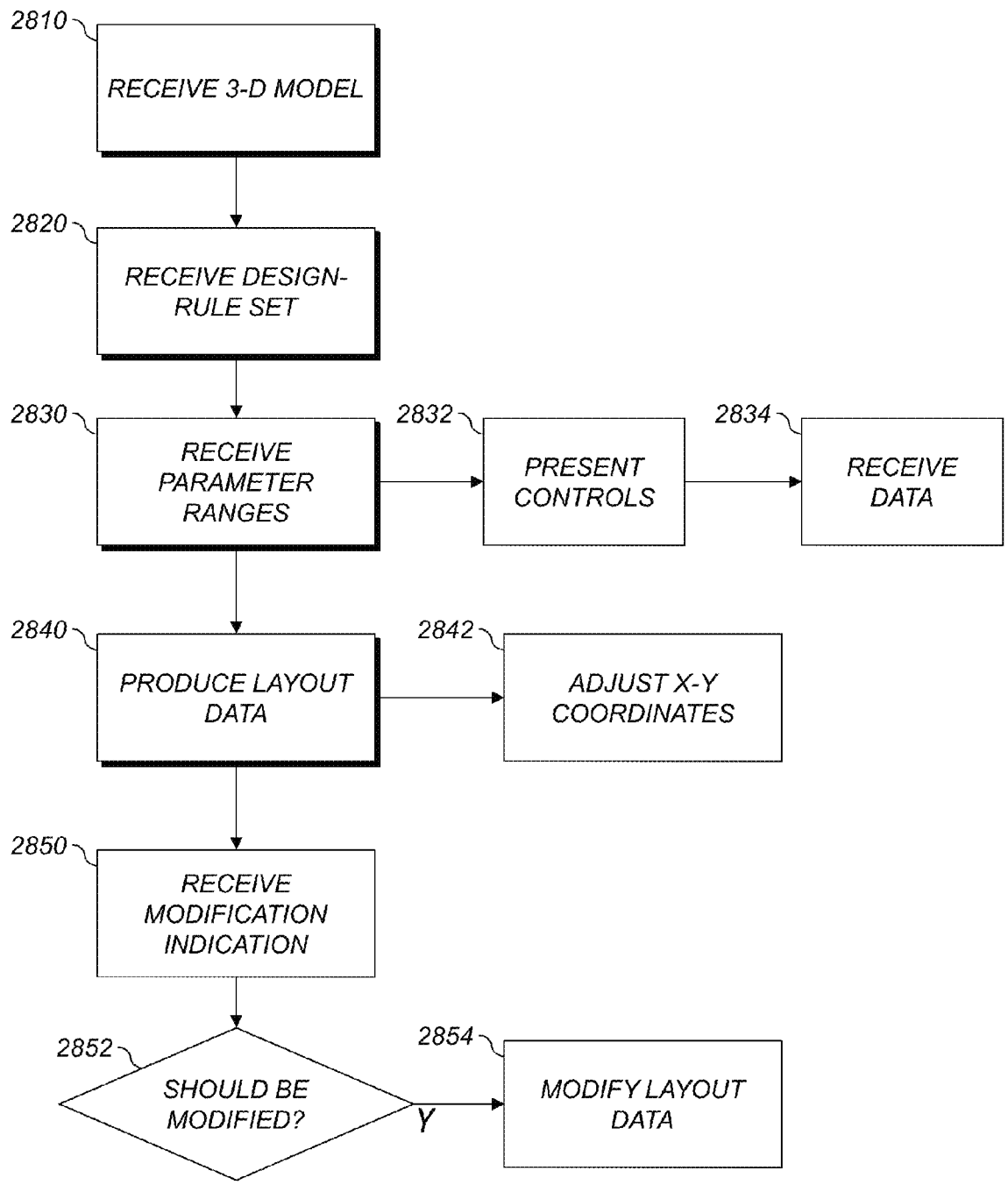
FIG. 28 shows methods for producing layout data corresponding to a reference microdevice according to various aspects.

FIG. 28 shows methods for producing layout data corresponding to a reference microdevice according to various aspects. Steps of these methods can be performed automatically using a controller. Processing begins with step 2810.

In step 2810, a three-dimensional model of the reference microdevice is received. The three-dimensional model including respective coordinates of a plurality of nodes and including one or more parameter(s). The parameters are to be swept; there can also be un-swept parameters. Step 2820 is next.

In step 2820, a design-rule set is received. The design-rule set includes respective constraint(s) on the parameter(s). Step 2830 is next.

In step 2830, respective parameter range(s) for the parameter(s) are received. Each parameter range includes a plurality of values within the constraint(s) corresponding to the respective one of the parameter(s). For example, one of the parameter ranges can include a low and a high point for the given parameter, both the low and the high point within the constraint for that parameter. See, e.g., FIG. 12B, in which angle is swept from 1° to 15° and flexure length is swept from 100e-6 to 300e-6. Step 2840 is next.

In step 2840, using the controller, the layout data are automatically produced using the three-dimensional model and the parameter range(s). The layout data includes two-dimensional data for each of one or more layer(s). The layout data are produced by determining a plurality of combinations, each including one of the values in each of the parameter range(s), and, for each of the plurality of combinations, adjusting at least some of the coordinates in the three-dimensional model according to the values in that combination and converting the adjusted coordinates in the three-dimensional model to x-y coordinates and layer numbers. In this way, the layout data includes data for a plurality of microdevices. An example of layout data is shown in FIG. 13.

In various aspects, producing-layout-data step 2840 includes step 2842. In step 2842, the x-y coordinates for each combination are adjusted. They can be adjusted so that the layout data specifies that the plurality of microdevices be positioned closely in a nonrectangular array. Alternatively, they can be adjusted so that the layout data specifies that the plurality of microdevices be positioned with bond pads aligned vertically and horizontally. The former occupies less of the surface of a wafer, but the latter may be easier to test with some probe stations.

In various aspects, modifications are performed to the layout. In step 2850, an indication is received of whether the layout requires a particular modification. Next is decision step 2852, which determines whether the indication indicated that a modification was required. If so, next is step 2854, in which the layout data are modified. Examples of modifications are discussed next. In these aspects, at least some of the coordinates in the three-dimensional model correspond to a structure.

In an example, step 2850 receives an indication of whether the structure needs to be released. Decision step 2852 first determines whether the structure is indicated as needing to be released. If so, decision step 2852 then automatically determines whether the structure requires etch holes using the design-rule set. If so, step 2854 is next. In step 2854, since the structure does require etch holes (this step would not be executed if not), the produced layout data are modified according to the design-rule set to include etch holes for the structure.

In another example, step 2850 receives an indication of whether bonding pads are required. If bonding pads are indicated as being required (step 2852), step 2854 includes modifying the produced layout data according to the design-rule set to add bond pads associated with coordinates specified in the three-dimensional model (e.g., ends of the crab legs in FIG. 10).

In another example, step 2850 receives an indication of whether common voltage tracers are required. If so (step 2852), the produced layout data are modified (step 2854) according to the design-rule set to add common voltage tracers associated with a common pad specified in the three-dimensional model (e.g., the tracer in FIG. 11). In various aspects, step 2854 further includes modifying the produced layout data according to the design-rule set to add additional metal to the common voltage tracers.

In various aspects, step 2830 of receiving the respective parameter range(s) for the parameter(s) includes steps 2832 and 2834.

In step 2832, a plurality of user-interface controls are presented to a user via a display. Each user-interface control corresponds to one of the parameters and is operative to permit the user to specify values within the corresponding constraint. For example, the user-interface controls can be sliders or direct-entry text boxes. The plurality of user-interface controls can include at least two controls for each parameter so that the controls for each parameter permit the user to specify the parameter range for that parameter. Step 2834 is next.

In step 2834, data of the parameter range(s) are received from the user-interface controls via a user-input device. The device can be, e.g., a mouse or keyboard, or another peripheral described above with reference to subsystem 2620 or 2630 (both FIG. 26).

In various aspects, a non-transitory tangible computer-readable medium has computer-executable instructions stored thereon for processing data of a three-dimensional model of a reference microdevice. The instructions include instructions to automatically receive the three-dimensional model of the reference microdevice, the three-dimensional model including respective coordinates of a plurality of nodes and including one or more parameter(s). The instructions also include instructions to receive a design-rule set including respective constraint(s) on the parameter(s). The instructions also include instructions to receive respective parameter range(s) for the parameter(s), each parameter range including a plurality of values within the constraint(s) corresponding to the respective one of the parameter(s). The instructions also include instructions to produce the layout data using the three-dimensional model and the parameter range(s), wherein the layout data includes two-dimensional data for each of one or more layer(s) and the instructions to produce the layout data include instructions to determine a plurality of combinations, each including one of the values in each of the parameter range(s), and instructions to, for each of the plurality of combinations, adjust at least some of the coordinates in the three-dimensional model according to the values in that combination and to convert the adjusted coordinates in the three-dimensional model to x-y coordinates and layer numbers, so that the layout data includes data for a plurality of microdevices.

In various aspects, at least some of the coordinates in the three-dimensional model correspond to a structure. The instructions further include instructions to receive an indication of whether the structure needs to be released. The instructions also include instructions to, using the design-rule set, automatically determine whether the structure requires etch holes if the structure is indicated as needing to be released. The instructions also include instructions to modify the produced layout data according to the design-rule set if the structure does require etch holes to include etch holes for the structure.

Various aspects relate to a method for gyroscopic analysis and optimization of microelectromechanical systems. A tool according to various aspects, e.g., an online design tool called GyroCube, can simplify the parametric exploration of ready-made Micro Electro Mechanical Systems (MEMS) gyroscopes. Tools according to various aspects can perform gyroscopic analysis on a variety of MEMS structures, e.g., those imported from Sugar. In addition to Sugar's existing MEMS solvers (e.g., frequency response, modal analysis, and transient analysis), various aspects add gyroscope-specific analyses (e.g., quality factor, normalized sensitivity, natural frequency, stiffness, damping ratio). Various aspects also include geometry optimization given a user's performance specification. The results of designs processed according to various aspects have been verified using finite element analysis. Various aspects of GyroCube advantageously provide improved ease of use compared to prior schemes.

Gyroscopes have applications in areas such as inertial navigation, automotive safety, and stability control systems, platform stabilization, including picture stabilization in camcorders and cameras, and robotics [B1]-[B2]. With the advent of Micro Electrical Mechanical System (MEMS), gyroscopes can now be produced cheaply and in very small packages in the micro domain with low power consumption [B3]-[B4]. Due to these advantages, MEMS gyroscopes have attracted a lot of attention in the past decade, while adequate designs usually require expertise in physics of gyroscopes, computer aided design, and processing technology. In particular, the design process is time consuming due to the lack of efficient design automation tools.

Although the applications of MEMS gyroscope may differ greatly, requiring various levels of accuracy, precision or robustness, the desired performance characteristics may be achieved by modifying the parameters of the structure simply. Thus, there is a growing need for engineers to easily and quickly predict the performance characteristics of MEMS gyroscope.

Various aspects of GyroCube address these needs. GyroCube can make it easier and faster to evaluate the performance of ready-designed gyroscopes, and can make the design process more accessible. Factors like resonant frequency, quality factor, or sensitivity can be shown directly, which can help users (e.g., engineers) to modify their design. System optimization permits the user to input a particular performance to output a suggested parameter change.

Below are described the GyroCube framework; factors in gyroscope design; steady state analysis, optimization analysis, and layout respectively; various simulated examples; and comparisons of GyroCube's simulated results with finite element analysis.

Figure 15A:
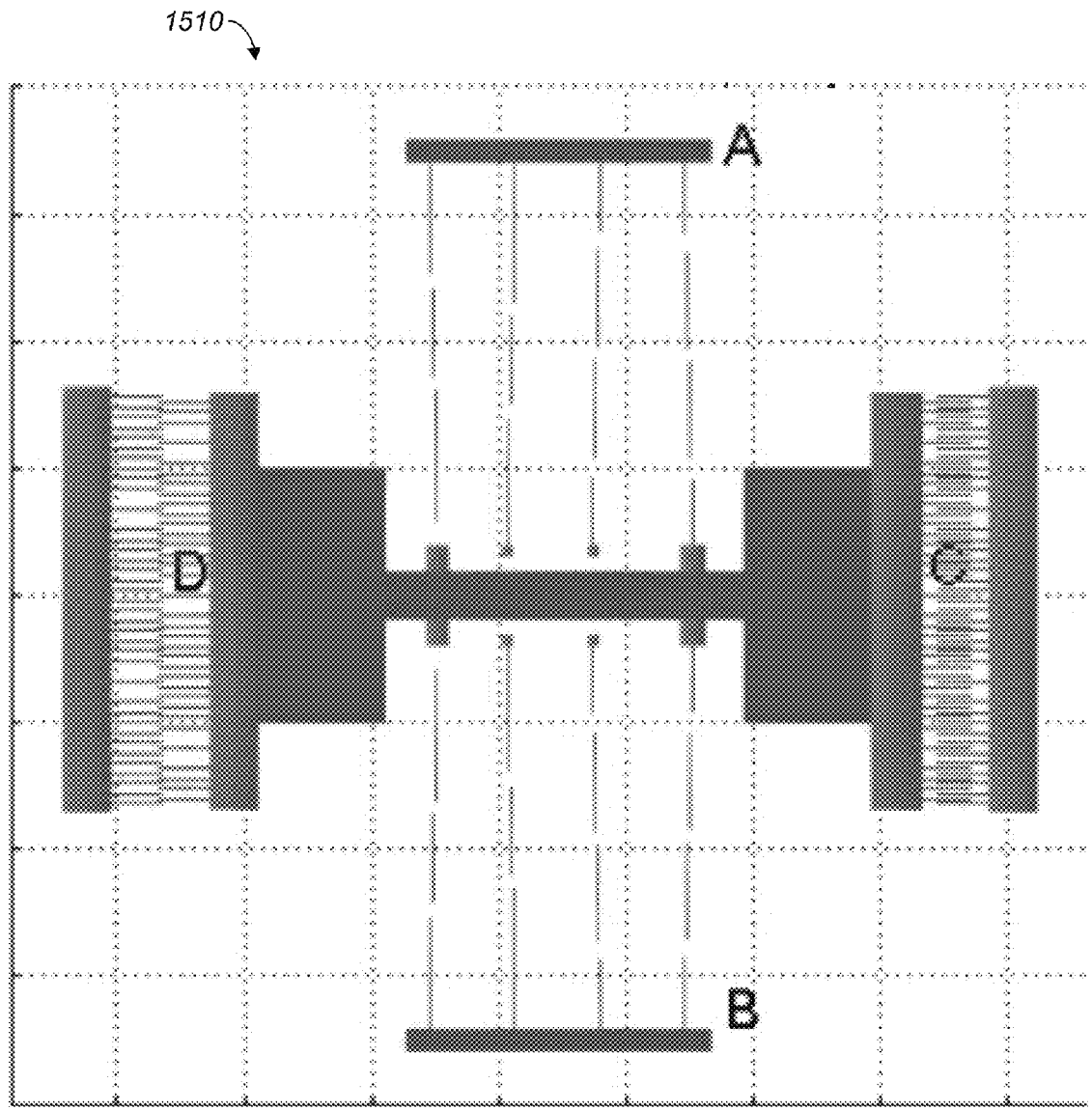
FIGS. 15A-C show an example of a user interface according to various aspects.
Figure 15B:
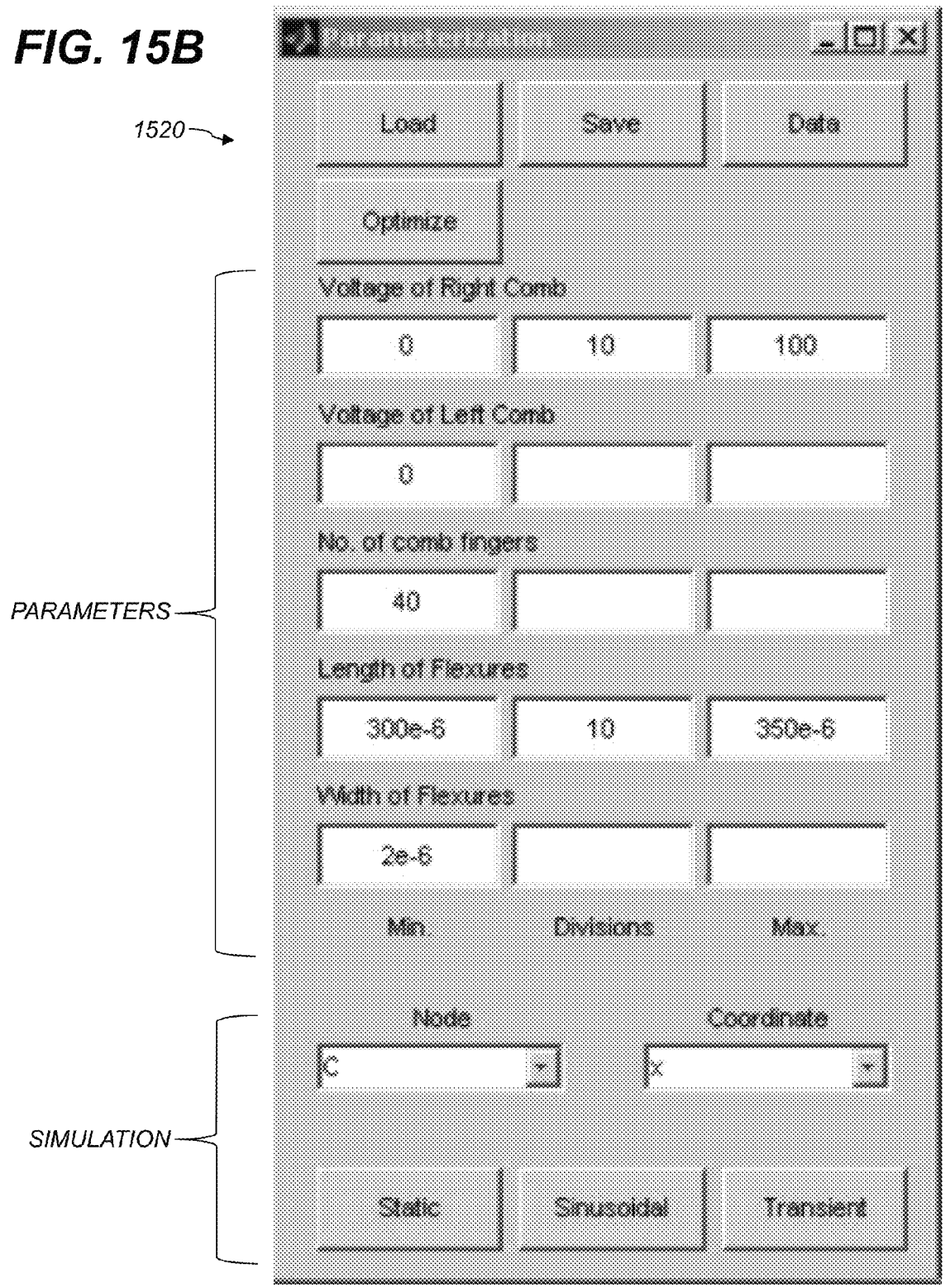
Figure 15C:
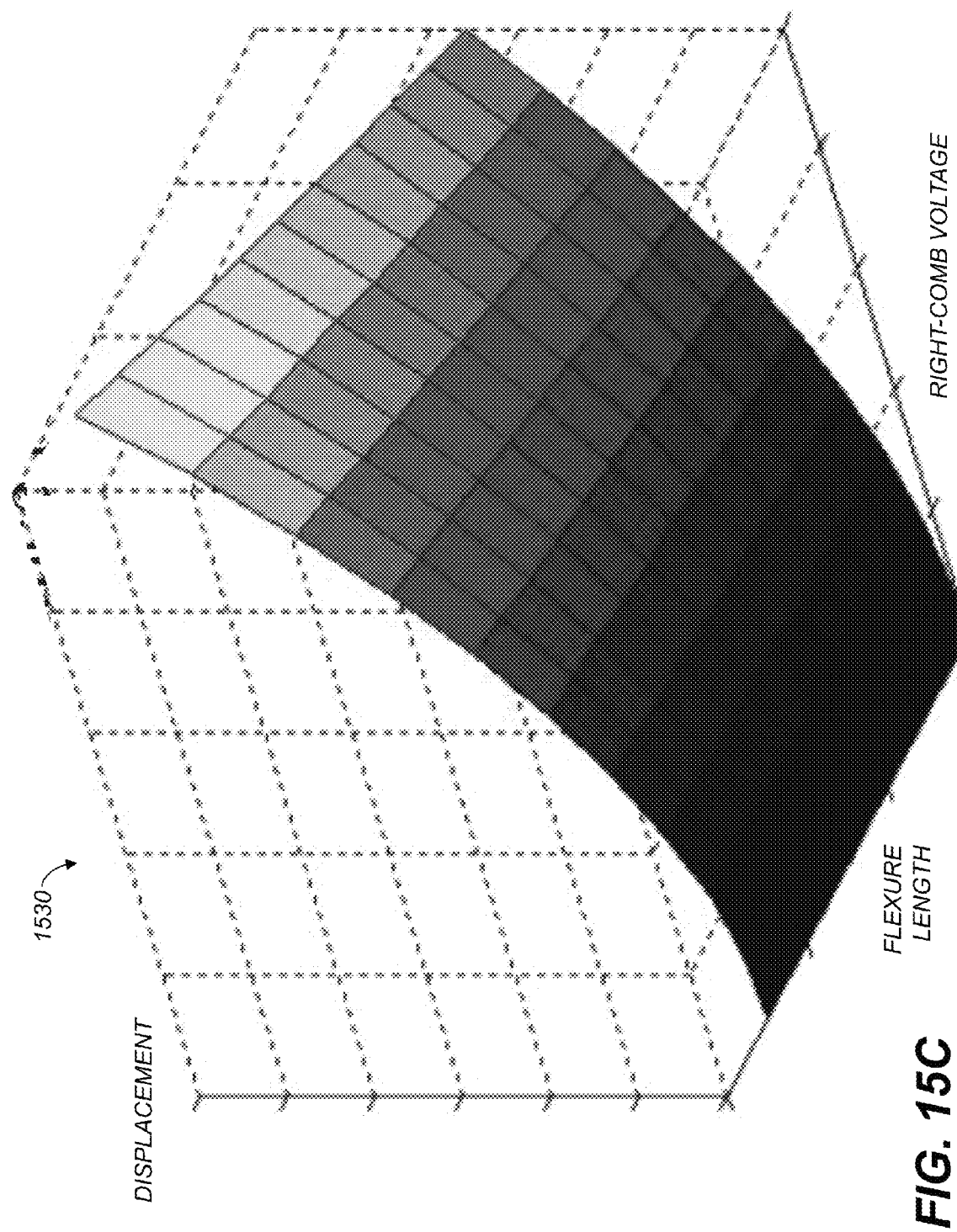

Sugar is a system-level design, modeling, and simulation tool for compact models of MEMS [B5]-[B6]. SugarCube is a novice-friendly online CAD tool for exploring the design space of parameterized MEMS [B7]. FIGS. 15A-C show an example of a user interface according to various aspects. The user interface, e.g., to SugarCube, includes parameterized control and output windows. Three main windows include MEMS display window 1510 (FIG. 15A), parameterization window 1520 (FIG. 15B), and plot window 1530 (FIG. 15C). Upon selecting a MEMS (a device) from a library, the device is displayed in main MEMS display window 1510 and pre-defined parameters associated with this model appear in the parameter window 1520. Output values of static parameters, 2D curves, or 3D manifolds of parameter sweeps appear in plot window 1530 (FIG. 15C; another example of a three-window configuration is shown in FIGS. 12A-C, discussed above). The right-comb voltage axis in plot window 1530 ranges from 0 to 100 with gridlines every 20. The flexure-length axis ranges from 3e-4 to 3.6e-4 by 0.2e-4. The displacement (simulation-result) axis ranges from 0 to 3e-5 by 0.5e-5. Solver options are given at the bottom of the parameterization window 1520.

Figure 16:
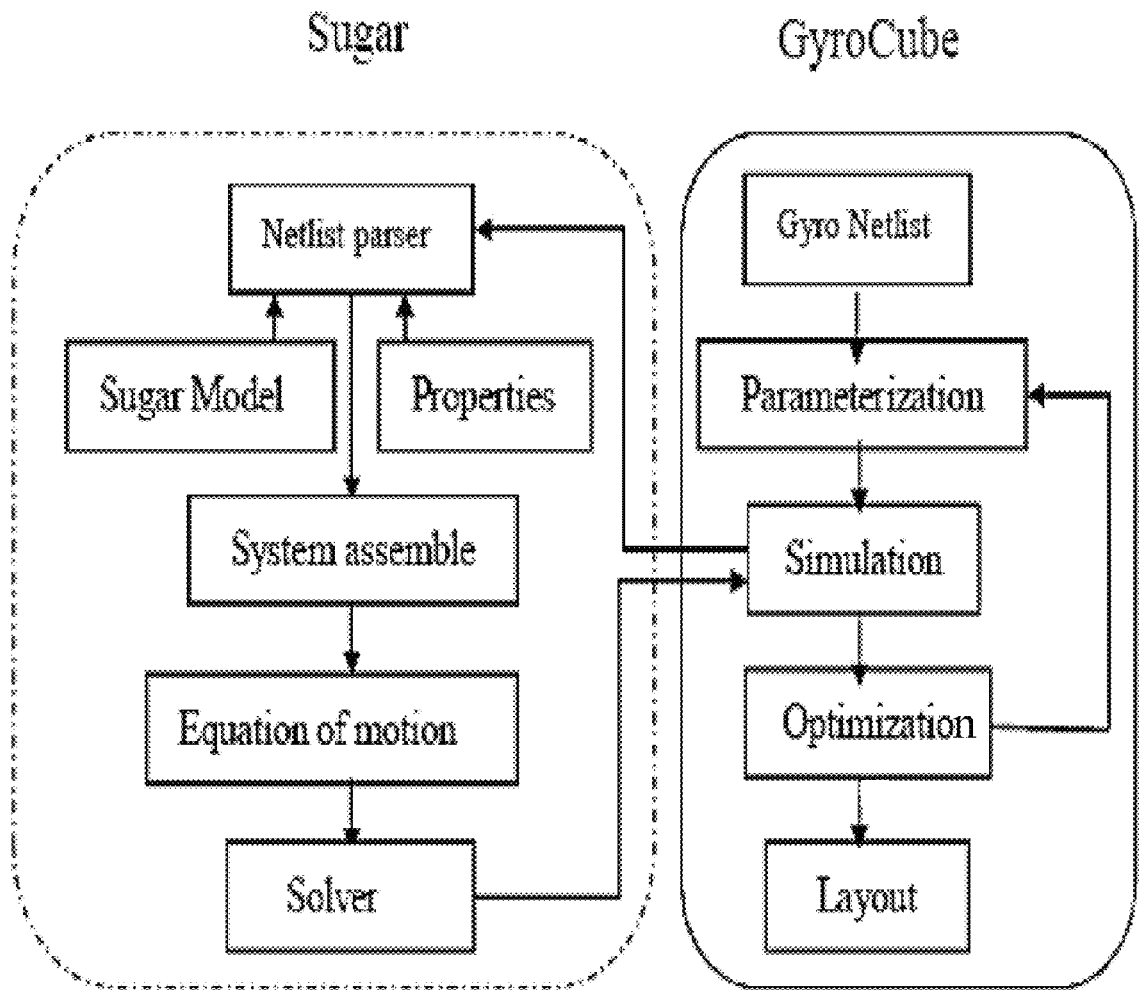
FIG. 16 shows a block diagram of a framework of a simulation tool according to various aspects.

Leveraging off of SugarCube, in various aspects, GyroCube adds gyroscope-specific analyses such as quality factor analysis, normalized sensitivity analysis, or stiffness analysis. FIG. 16 shows a block diagram of a framework of a simulation tool (e.g., GyroCube) according to various aspects. The arrows indicate directions of data flow. A netlist created in Sugar can generally be imported into GyroCube. GyroCube performs gyroscope-specific analyses such as normalized sensitivity, stiffness, quality factor, static, steady state, or sinusoid. According to user's output performance specifications, optimization automatically manipulates the geometry of the design to achieve such performance. When desired performance can be achieved, a layout function can be used to provide GDSII layout for fabrication, e.g., as discussed above with reference to FIGS. 8 and 9.

Figure 17:
FIG. 17 is a flowchart of ways a user can use a simulation tool according to various aspects.

Referring to FIG. 17, in various aspects, a user can use a simulation tool (e.g., GyroCube) according to various aspects as follows. A user: loads a netlist created in Sugar into GyroCube (step 1710); prescribes changes in the geometric and material properties of the design (step 1720); and simulates the resulting configuration (step 1730).

Figure 18:
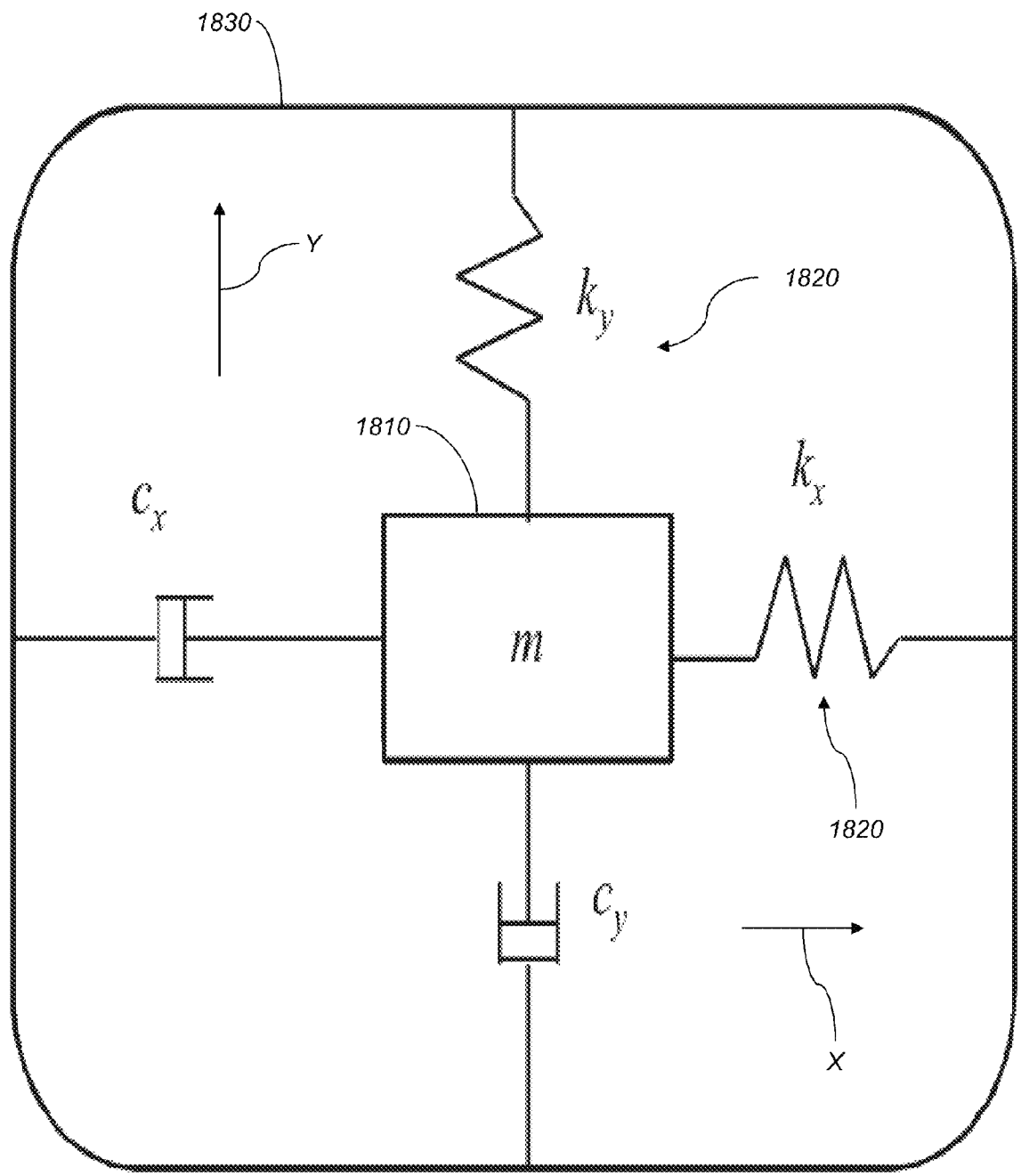
FIG. 18 shows a configuration of an exemplary planar vibratory rate gyroscope.

Referring to FIG. 18, A configuration of a planar vibratory rate gyroscope is a single proof mass 1810 supported by flexures 1820 that allows 2D motion. Flexures 1820 are attached to supporting frame 1830. Here, the mass is electrostatically driven into resonance along x-axis X, and the Coriolis force excites the sensor along y-axis Y [B8].

A vibratory rate gyroscope includes a proof mass 1810 which is free to oscillate in tow principle orthogonal directions: drive (X) and sense (Y). Variables $k_x$ and $k_y$ are respective stiffnesses for the x-axis and the y-axis. Variables $c_x$, $c_y$ are respective damping factors for the x-axis and the y-axis, and m is the proof mass.

A system model for the drive axis can be written as:

$$m_x \ddot{x} + c_x \dot{x} + k_x x = F_x(t) \tag{1}$$

$$\ddot{x} + 2\xi_x \omega_x \dot{x} + \omega_x^2 x = \frac{F_x(t)}{m_x} \tag{2}$$

where x is the displacement, $m_x$ is the proof mass, $k_x$ is the stiffness, $c_x$ is the damping factor, and the undamped natural frequency and damping ratio is defined as follows:

$$\omega_x = \sqrt{\frac{k_x}{m_x}} \tag{3}$$

$$\xi_x = \frac{c_x}{2\sqrt{k_x m_x}} = \frac{c_x}{2 m_x \omega_x} \tag{4}$$

System (1) can be regarded as a resonator. When the resonator is excited with a harmonic force $F_x = F_0 \sin \omega_d t$ at frequency $\omega_d$, the steady state component of the response is also harmonic, in the form of $$x = x_0 \sin(\omega_d t + \phi_x) \quad (5)$$
where $$x_0 = \frac{F_0/k_x}{\sqrt{\left[1-\left(\frac{\omega_d}{\omega_x}\right)^2\right]^2 + \left[\frac{1}{Q_x}\frac{\omega_d}{\omega_x}\right]^2}}$$

$$\phi_x = -\tan^{-1}\left(\frac{2\xi_x \frac{\omega_d}{\omega_x}}{1-\left(\frac{\omega_d}{\omega_x}\right)^2}\right) \quad (5B)$$

When the drive frequency $\omega_d$ equals the natural frequency $\omega_x$, the resonant amplitude and its corresponding phase are $$|x_0|_{res} = \frac{F_0}{2k_x \xi_x}, \text{ and } \phi = 90° \quad (6)$$

The quality factor is defined as $$Q_{x/y} = \frac{1}{2\xi_{x/y}} = \frac{m_{x/y}\omega_{x/y}}{c_{x/y}} \quad (7)$$

The importance of the quality factor is that it directly scales the amplitude at resonance. The oscillation amplitude at resonance can be found as $$|x_0|_{res} = Q_x \frac{F_0}{k_x} \quad (8)$$

Using similar derivation, the resonant amplitude for the sense axis can be obtained as $$|y_{0res}| = \Omega \frac{2Q_y x_0}{\omega_y} \quad (9)$$

where $Q_y$ is the quality factor for sense axis, $\Omega$ is the rotation rate to be measured, $\omega_y$ is the resonant frequency for y-axis, and here it is assumed that the same mass is used for drive axis and sense axis.

Another important factor is the displacement sensitivity, which is defined as [per B9]:

$$S_d = \frac{d y_{0res}}{d\Omega} = \frac{2x_m}{\omega_y} \frac{\omega_x/\omega_y}{\sqrt{\left[1-\left(\frac{\omega_x}{\omega_y}\right)^2\right]^2 + \left[\frac{1}{Q_y}\frac{\omega_x}{\omega_y}\right]^2}} \quad (10)$$

Equation (10) shows the relationship between the maximum displacement in sense mode and the rotation rate to be measured. Improving this sensitivity can help greatly to improve system performance. The normalized displacement sensitivity is defined as [per B9]:

$$S_{dn} = \frac{\omega_x/\omega_y}{\sqrt{\left[1-\left(\frac{\omega_x}{\omega_y}\right)^2\right]^2 + \left[\frac{1}{Q_y}\frac{\omega_x}{\omega_y}\right]^2}} \quad (11)$$

Figure 19:
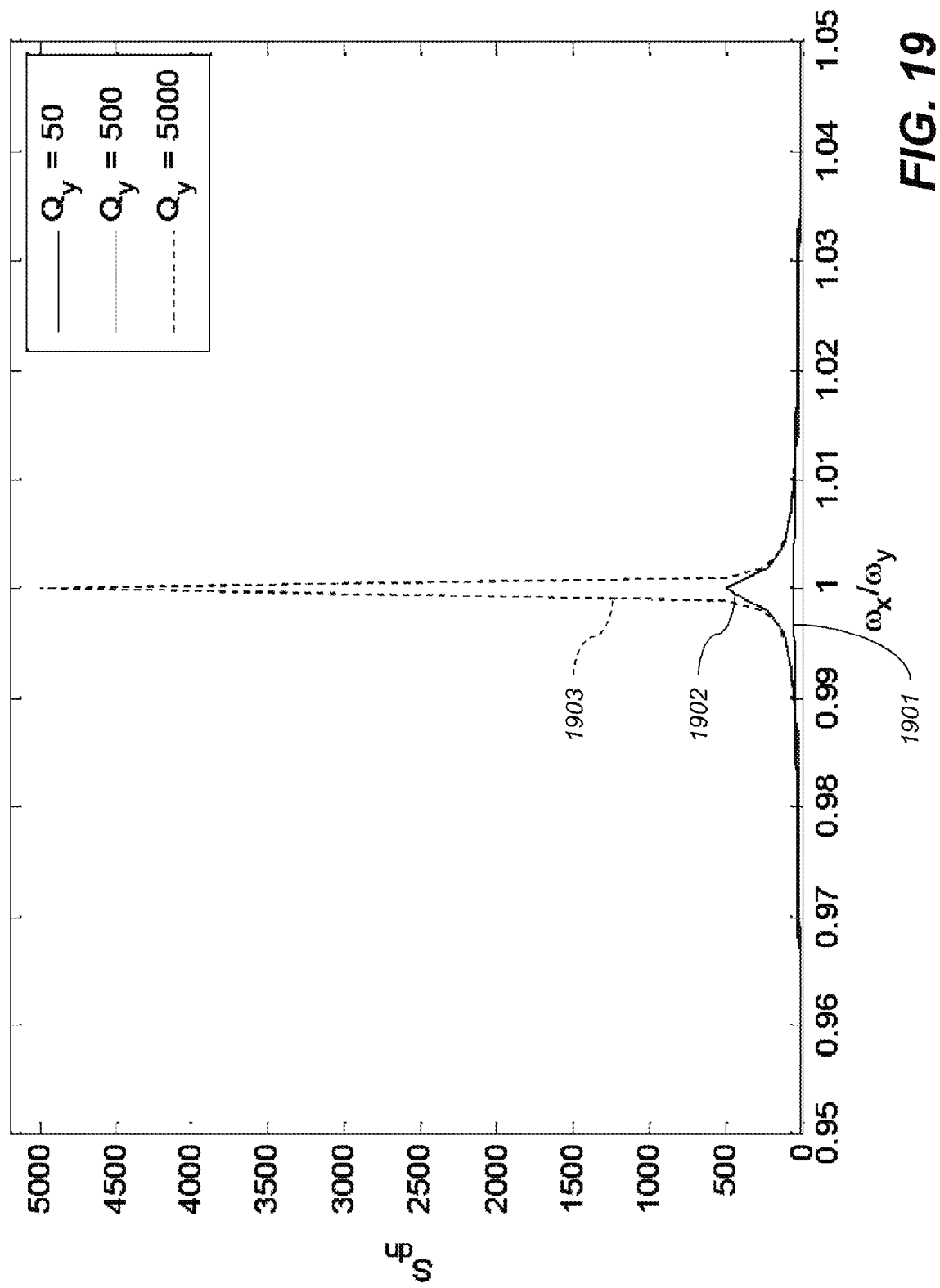
FIG. 19 shows a simulation of normalized sensitivity for different quality factors.

FIG. 19 shows a simulated relationship between normalized sensitivity and $\omega_x/\omega_y$ for different quality factors. The ordinate is normalized sensitivity and the abscissa is $\omega_x/\omega_y$. Plots are shown for different quality factors $Q_y$. Curve 1901 has $Q_y$=50. Curve 1902 has $Q_y$=500. Curve 1903 has $Q_y$=5000. Normalized sensitivity can be improved by increasing quality factors. Quality factors can be obtained directly from GyroCube (according to various aspects, GyroCube can produce quality factors).

Equations (8)-(10) show that the sensitivity of the gyroscope to the angular rate input $\Omega$ can be improved by: (1) increasing quality factors $Q_x$ and $Q_y$; (2) increasing the drive-mode oscillation amplitude $x_0$; or (3) increasing the proof mass that generates the Coriolis force.

To determine the frequency response of a gyroscope, its system model can be written as:

$$\begin{cases} M\ddot{x} + D\dot{x} + Kx = F \\ y = Lx \end{cases} \quad (12)$$

where M, D, and K are the multidisciplinary mass, damping, and stiffness matrices of the system, respectively, and F is force. Examples of systems with similar models are given in application PCT/US2009/003960 by Fallon, published as WO 2010/005546, in US20050171742 by Bennighof, and in US20110314910 by Chen et al., each of which is incorporated herein by reference. Such system models can be used with any system whose mathematical form matches the model in (12), as is well known in the physical-system-modeling art. This second order system can be written in the following multi-input multi-output system (MIMO) form $$\begin{cases} \dot{q} = Aq + Bu \\ y = Cq \end{cases} \quad (13)$$
where $$q = \begin{bmatrix} x \\ \dot{x} \end{bmatrix}, A = \begin{bmatrix} I & 0 \\ -\frac{D}{M} & -\frac{K}{M} \end{bmatrix}, u = \frac{F}{M}, B = \begin{bmatrix} 0 \\ I \end{bmatrix}, C = [L \ 0]. \quad (13B)$$

Then, from the solution of (13), frequency response and steady-state response can be obtained [B10].

Although analysts can change modeling parameters to examine their sensitivities, this process can be tedious. Also, it is sometimes not obvious which parameter(s) should be changed, and by how much each parameter should be changed, to achieve a specific performance. With various aspects, e.g., GyroCube, users can specify performance and receive the suggested parameter value(s) with few button clicks.

With the desired system performance and the range of the parameters, an objective function can be written as $$\tilde{X}(P,C) = X_{desired} - X_{simulated}(P,C) \quad (14)$$

where $X_{desired}$ is the desired performance, $X_{simulated}(P, C)$ is the simulated performance. $\tilde{X}(P,C)$ is the difference between the desired and simulated performances, P is a vector of the parameters chosen for optimization, and C is vector of the remaining parameters to be held constant in the parameter list. This comparison can be done iteratively using MATLAB's built-in function called fminsearch. Function fminsearch can find the minimum of a scalar function of several variables, starting at an initial estimate. In various aspects the objective function is (14), and for each iteration, the algorithm generates a new set of parameter values P, until (14) reaches a particular tolerance. Once optimized, P is the desired solution for specific performance.

The task of manually creating MEMS gyroscope layout array can be tedious, time consuming, and prone to human errors. In some prior schemes, the simulation tool and layout tool are separate and do not communicate with each other. In such cases the designer is required, according to prior schemes, recreate the geometry in the layout tool after simulation. The designer might also have to include etch holes, dimples, anchor layer connects, grounding planes, electrical tracers, and try to create arrays of geometric configurations that vary in one or more parameters. In various aspects, GyroCube can advantageously automatically check for design rules, place etching holes, supply connecting layers for anchors and bonding pads topped with metal, or supply common ground tracers between structures, e.g., as discussed above. In various aspects, GyroCube can provide a GDS-II layout file of arrayed designs upon user request, e.g., upon a click of a button in GyroCube.

Figure 20:
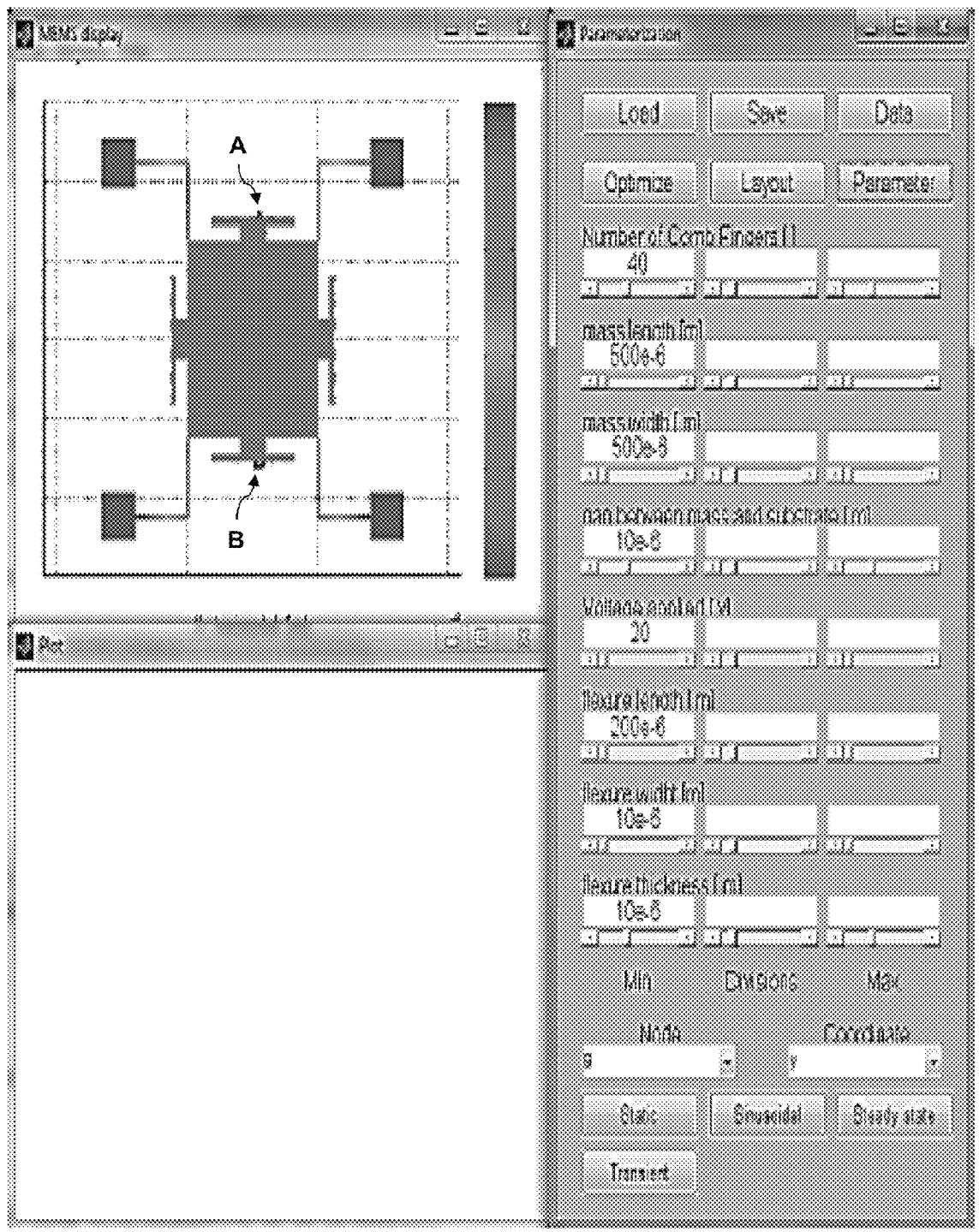
FIG. 20 shows a representation of a structure that was simulated.

FIG. 20 shows a representation in GyroCube of a structure that was simulated. This structure is similarly used in [B8]. A static analysis (upper-left window) of the gyroscope is shown. Damping ratio, stiffness, quality factor, normalized sensitivity in x-axis and y-axis, and other characteristic quantities listed below can be shown in the lower-left window ("Plot"). For this figure, the displacement for Node B in the vertical (y) direction is $1.943 \times 10^{-10}$ m. In this example, the following characteristics can be shown in the Plot window:

| | |
|---|---|
| Rotation rate to be measured [rad/sec] | 7.2685e−005 |
| The damping ratio in X is | 7.6892e−004 |
| The damping ratio in X is | 7.6892e−004 |
| The stiffness in X axis is [N/m] | 5.1449e+002 |
| The stiffness in Y axis is [N/m] | 5.1451e+002 |
| The quality factor in X is | 6.5025e+002 |
| The quality factor in Y is | 6.5026e+002 |
| The resonant frequency in X is | 2.6418e+005 |
| The resonant frequency in Y is | 2.6418e+005 |
| The normalized sensitivity in X axis is | 6.5000e+002 |
| The normalized sensitivity in Y axis is | 6.5001e+002 |
| Displacement at the given node and coordinate is [m] | 1.9436e−010 |

Parameters shown include:

| | |
|---|---|
| Number of Comb Fingers | 40 |
| mass length [m] | 500e−6 |
| mass width [m] | 500e−6 |
| gap between mass and substrate [m] | 10e−6 |
| Voltage applied [v] | 20 |
| Flexure length [m] | 200e−6 |
| Flexure width [m] | 10e−6 |
| Flexure thickness [m] | 10e−6 |

Figure 21:
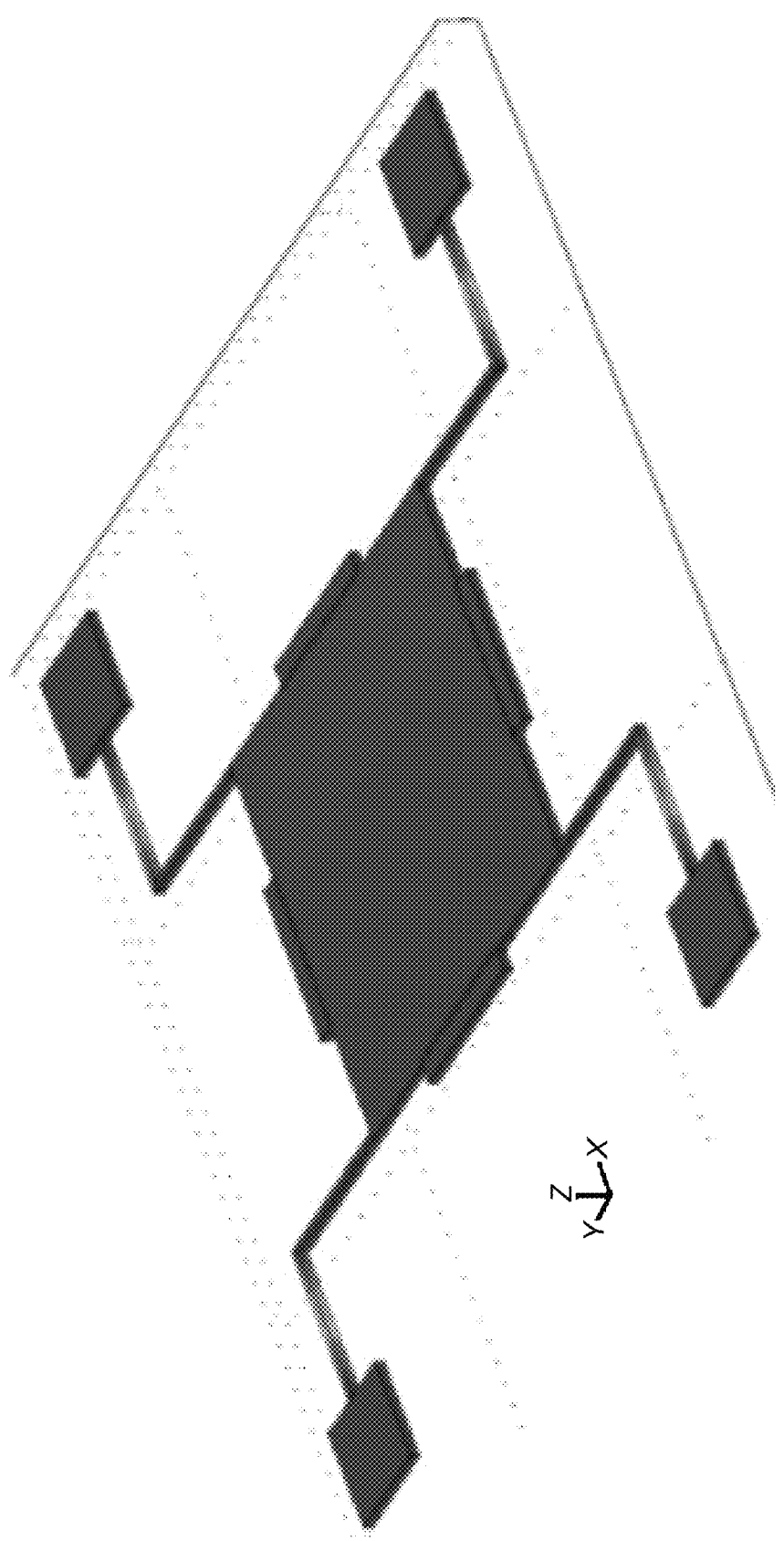
FIG. 21 shows simulation results for a finite element analysis counterpart of the structure shown in FIG. 20.

FIG. 21 shows simulation results for a finite element analysis counterpart of the structure shown in FIG. 20. The same mass and stiffness parameters were used here as in GyroCube. To reduce the amount of memory required, a mass-equivalent block was used in place of a multitude of comb fingers. The displacement in the y direction was simulated to be $1.899 \times 10^{-10}$ m, which is a difference of 3% of the compact model. The figure shows Boundary: y-displacement [m]. The legend extends from −7.302e-14 to 1.889e-10. The X axis has gridlines at −5e-5 and 0. The Y axis has gridlines at 0 and 5e-5. The Z-axis is as shown.

In GyroCube, according to various embodiments, for this structure, the electric static force in y direction from the comb drive is $$F_{comb} = -\frac{\varepsilon \cdot h}{g} N \cdot V^2 \quad (15)$$

where $\varepsilon$ is the permittivity of the medium, N is the number of comb fingers, h is the layer thickness, g is the gap between comb fingers, and V is the applied voltage. Based on this, the displacement in y direction calculated by GyroCube is $1.943 \times 10^{-10}$ m. Applying the same force in the finite-element analysis (FEA) model (FIG. 21) yields a displacement of $1.899 \times 10^{-10}$ m. The relative error between the two results is less than 3%. From the applied force and the displacement, the stiffness from GyroCube can be verified. Similarly, characteristic quantities like resonant frequencies, damping ratios, and sensitivities can also be verified.

Figure 22:
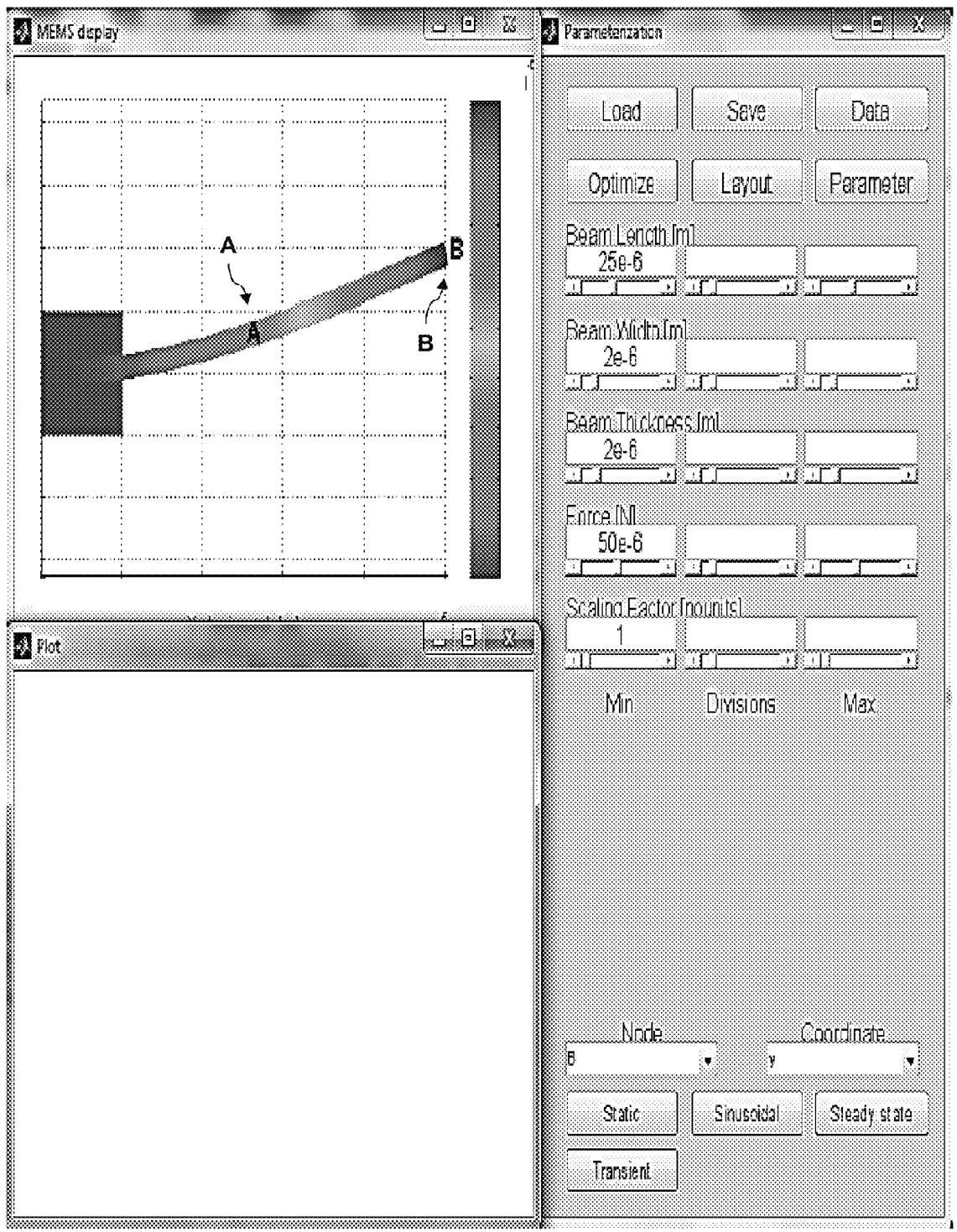
FIG. 22 shows a simulation of an exemplary cantilever.

Tools and methods according to various aspects can operate on a variety of MEMS netlists to analyze each for its gyroscopic properties. For example, consider a cantilever. As shown in FIG. 22, the stiffness in the x direction is 10,000 times (four orders) larger than that in the y direction. The normalized sensitivity in x and y are 0.01, and the quality factor in x and y is $3.096 \times 10^4$, $3.096 \times 10^2$ respectively. The quality factors are large, but the normalized sensitivity is small. The reason for this can be easily seen from FIG. 19. When $\omega_x/\omega_y \gg 1$, the quality factor has less effect on scaling normalized sensitivity (curves 1901, 1902, 1903 are close together for $\omega_x/\omega_y \gg 1$). And the sensitivities along both axes are relatively small, which indicates that this would not be an adequate gyroscope. The properties listed below can be shown in the lower-left window ("Plot"):

| | |
|---|---|
| Rotation rate to be measured [rad/sec] | 7.2685e−005 |
| The damping ratio in X is | 1.6152e−003 |
| The damping ratio in X is | 1.6152e−003 |
| The stiffness in X axis is [N/m] | 6.6000e+003 |
| The stiffness in Y axis is [N/m] | 6.6000e−001 |
| The quality factor in X is | 3.0955e+004 |
| The quality factor in Y is | 3.0955e+002 |
| The resonant frequency in X is | 5.9891e+007 |
| The resonant frequency in Y is | 5.9891e+005 |
| The normalized sensitivity in X axis is | 1.0001e−002 |
| The normalized sensitivity in Y axis is | 1.0001e−002 |
| Displacement at the given node and coordinate is [m] | 934697e−006 |

Parameters shown include:

| | |
|---|---|
| Beam Length [m] | 25e−6 |
| Beam Width [m] | 2e−6 |
| Beam Thickness [m] | 2e−6 |
| Force [N] | 50e−6 |
| Scaling Factor [nounits] | 1 |

Figure 23A:
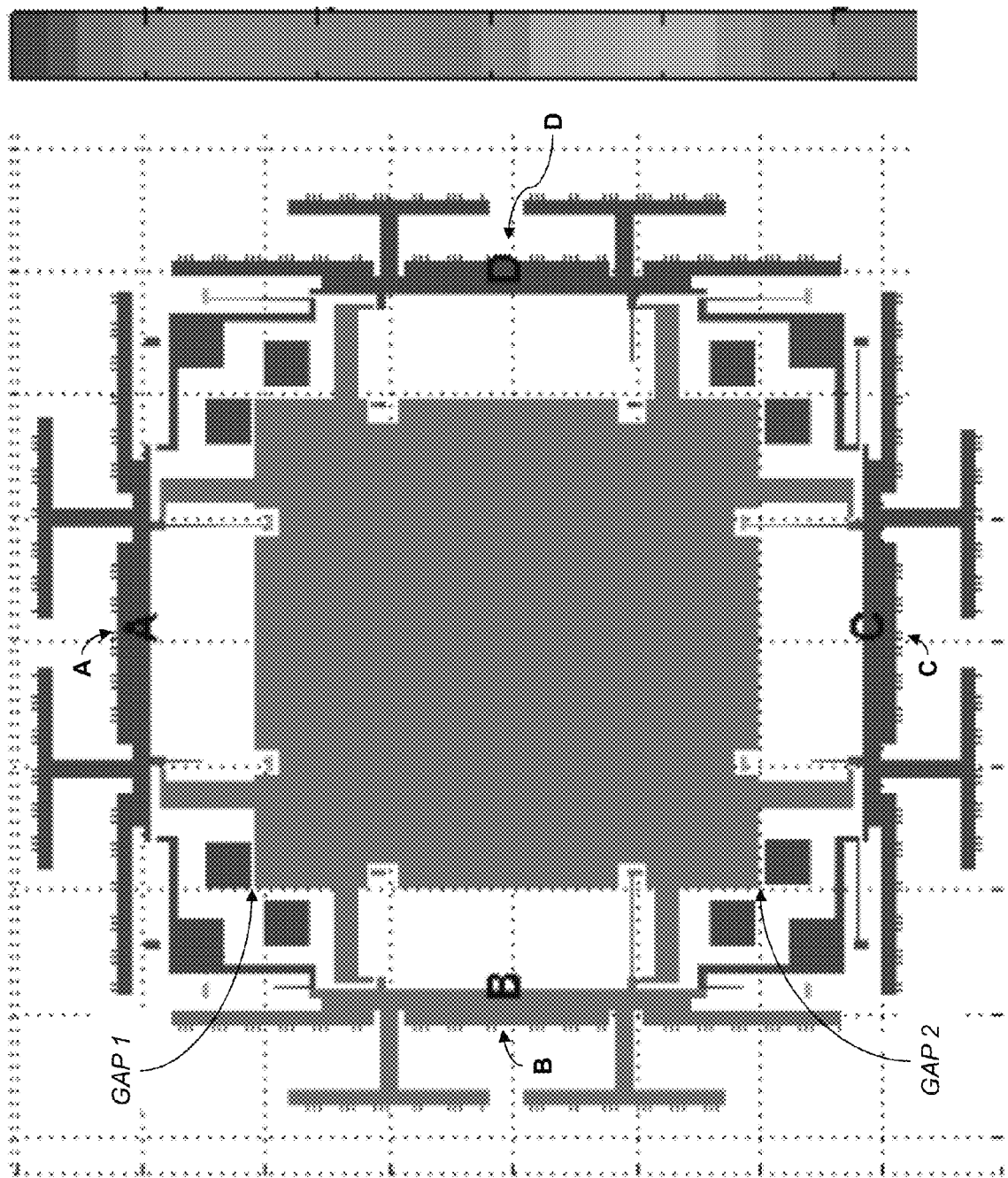
FIGS. 23A-C show examples of a steady state analysis of a self-calibratable gyroscope.
Figure 23B:
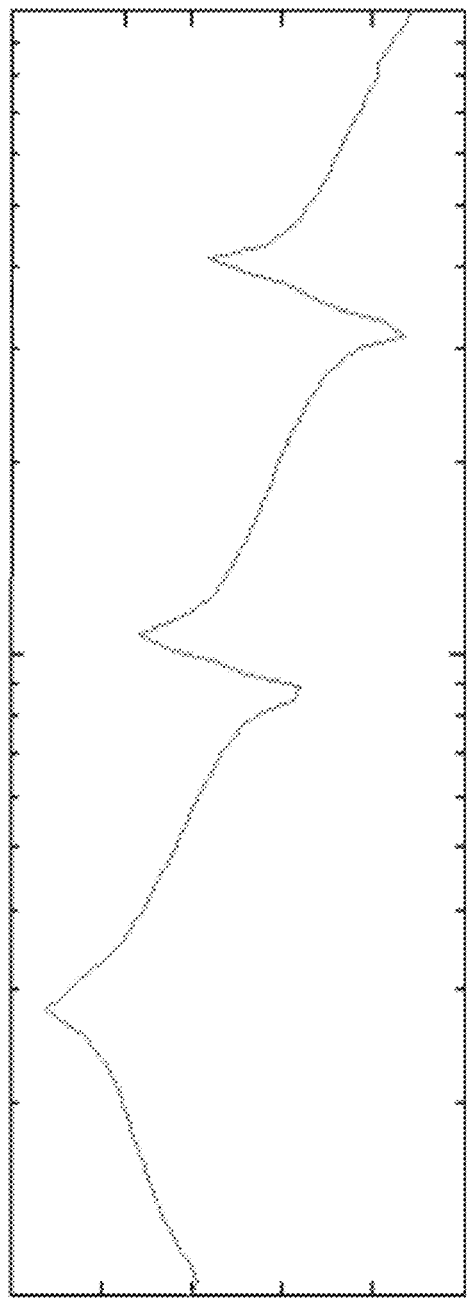
Figure 23B:
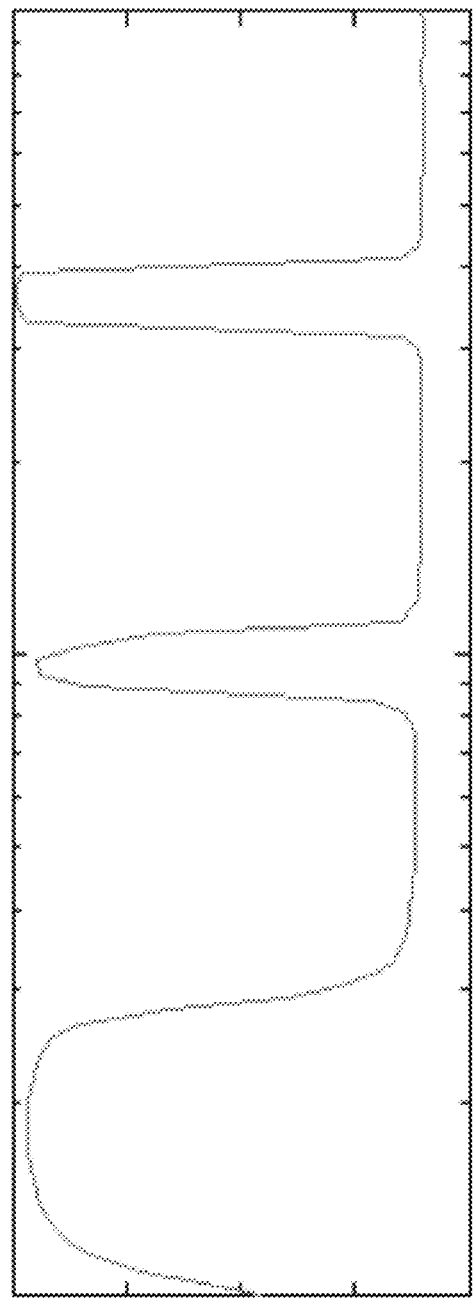
Figure 23C:
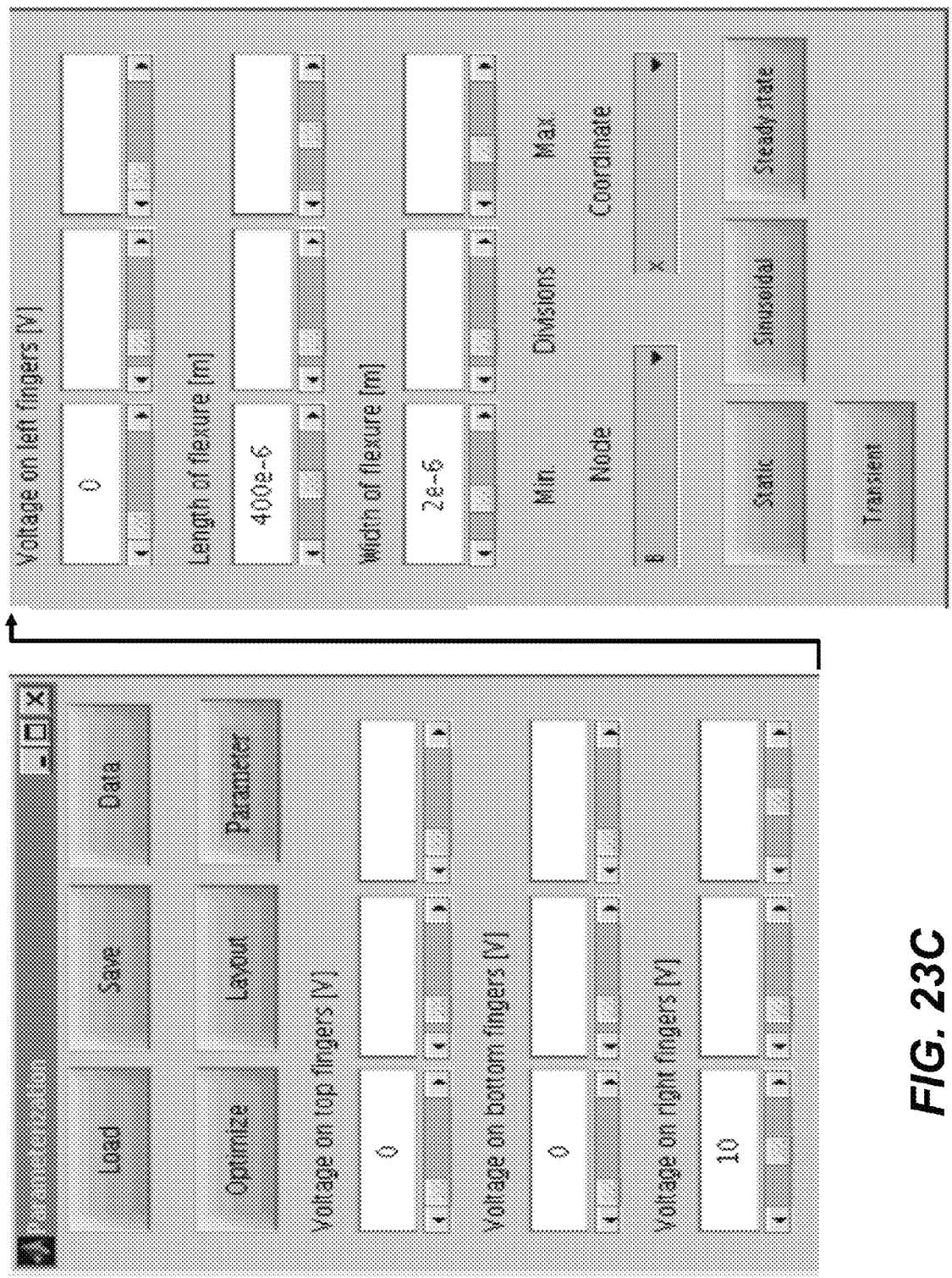

FIGS. 23A-C show an exemplary steady state analysis of a self-calibratable gyroscope. FIG. 23A shows the MEMS, FIG. 23B shows a plot of simulation, and FIG. 23C shows parameters. This gyroscope is modified from Shkel and Trusov [B8], where gap-stops (GAP 1 and GAP 2) have been added for self-calibration of, e.g., stiffness, mass, or displacement. This design is complicated, and it can be difficult to analyze this design by FEA due to memory consumption. In FIG. 23A, the X axis is horizontal [m]. The Y axis is vertical [m] and has gridlines from −3e-3 to 0.5e-3 by 0.5e-3. The plot shows X-displacement [m]. The legend extends from below 0.5e-6 to above 2.5e-6. In FIG. 23B, plot 2301 shows (abscissa) frequency (rad/s) on a log scale extending from $10^4$ to $10^6$ vs. (ordinate) magnitude in dB from −80 to 20 by 20. Plot 2302 also shows frequency $10^4$-$10^6$ rad/s on the X-axis, and shows phase in degrees on the Y axis, from −200 to 0 by 50. A frequency-response simulation can be performed by a program prompting a user for an initial frequency (in powers of 10, e.g., 1e4), a final frequency (in powers of 10, e.g., 1e5), and a number of points (e.g., 100). FIG. 23C is shown split for clarity (as indicated by the bent arrow) but can be presented in a single column.

The self-calibratable MEMS gyroscope includes 2,000 comb fingers and orthogonal movable-guided flexures. These flexures allow the proof mass to translate with two degrees of freedom, and resist rotation. In addition, a set of fixed guided flexures allows each comb drive only one degree of freedom. The magnitude and phase of the x-coordinate of node C is swept from 10 k . . . 1M rad/sec. This design is modified from Shkel and Trusov [B8], where gap-stops have been included for self-calibration of stiffness, mass, displacement.

Figure 24:
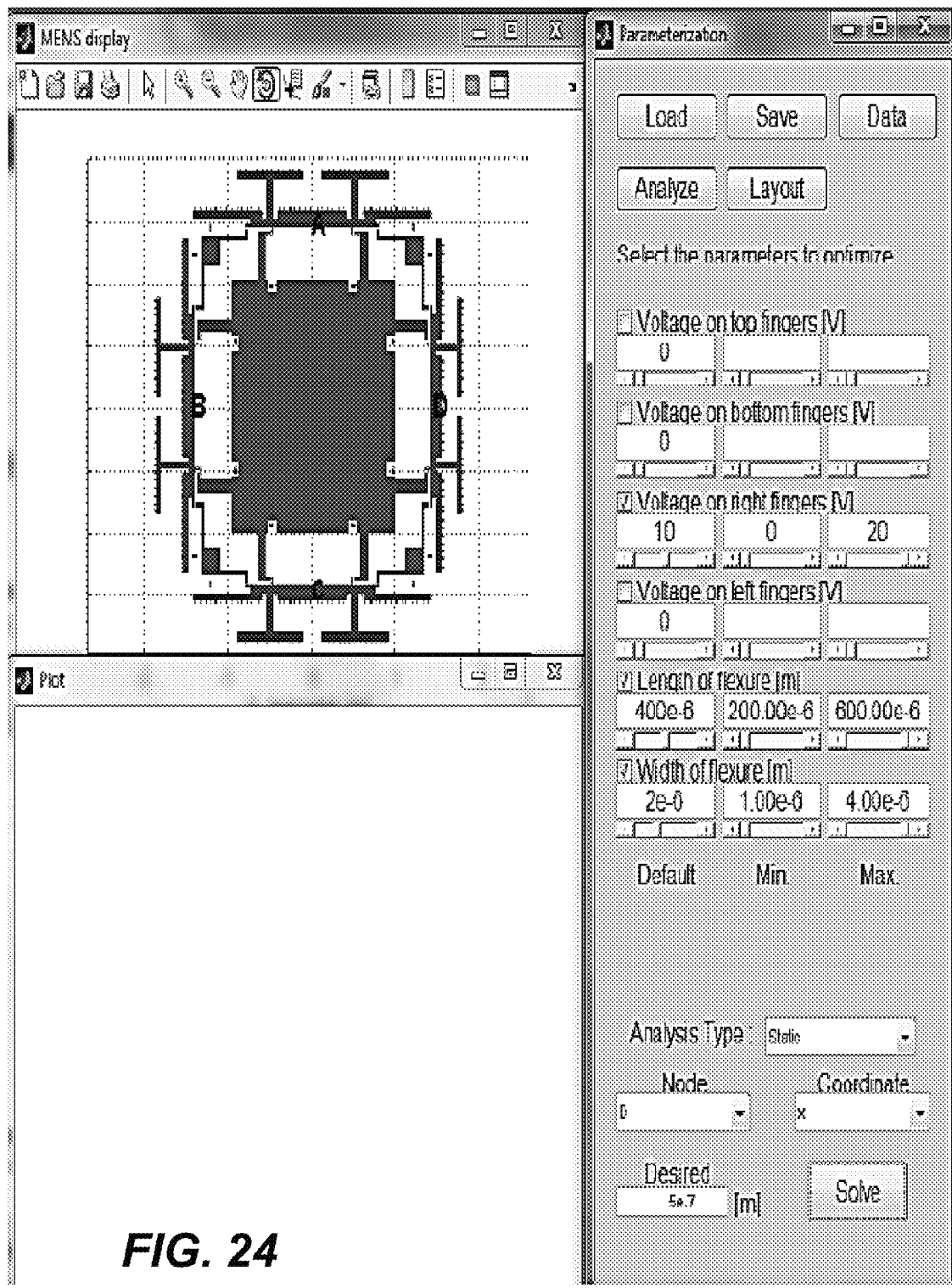
FIG. 24 shows a simulation of an exemplary gyroscope.

FIG. 24 shows a simulation of an exemplary gyroscope that is optimized to meet a desired static deflection to the right of 0.5 µm. In the parameter list (right window), parameters that are chosen to be held constant have a single value, while those that are chosen for optimization are specified by minimum and maximum values, and an initial guess. That is, the voltage of the right comb drive is permitted to vary between 0 and 20V with an initial guess of 10V, the support flexure lengths can vary between 400 and 600 µm with an initial guess of 200 µm, and the support flexure widths are allowed to vary between 1 to 4 µm with an initial guess of 2 µm. The x coordinate of location D on the structure is monitored during this optimization. The three parameter ranges are automatically searched simultaneously. The optimal (non-unique) parameters found are a voltage of 9.92V, support flexure lengths of 218 µm, and support flexure widths 2 µm. These parameters can be shown in the lower-left window ("Plot").

Continuing with FIG. 24, static optimization of a self-calibratable gyroscope is shown as an example. As can be seen in the parameter list, voltage on right comb drive, support flexure lengths, and support flexure widths are chosen for optimization by choosing initial guesses and the bounded range of the search. The chosen analysis type as static and the desired performance for GyroCube's optimization search is a deflection in x of 0.5 µm. GyroCube sweeps the three parameters and shows the one possible set of non-unique parameters. In this case, GyroCube determined that the voltage, length, and width should be 9.92V, 218.64 µm, and 2 µm, respectively.

Figure 25:
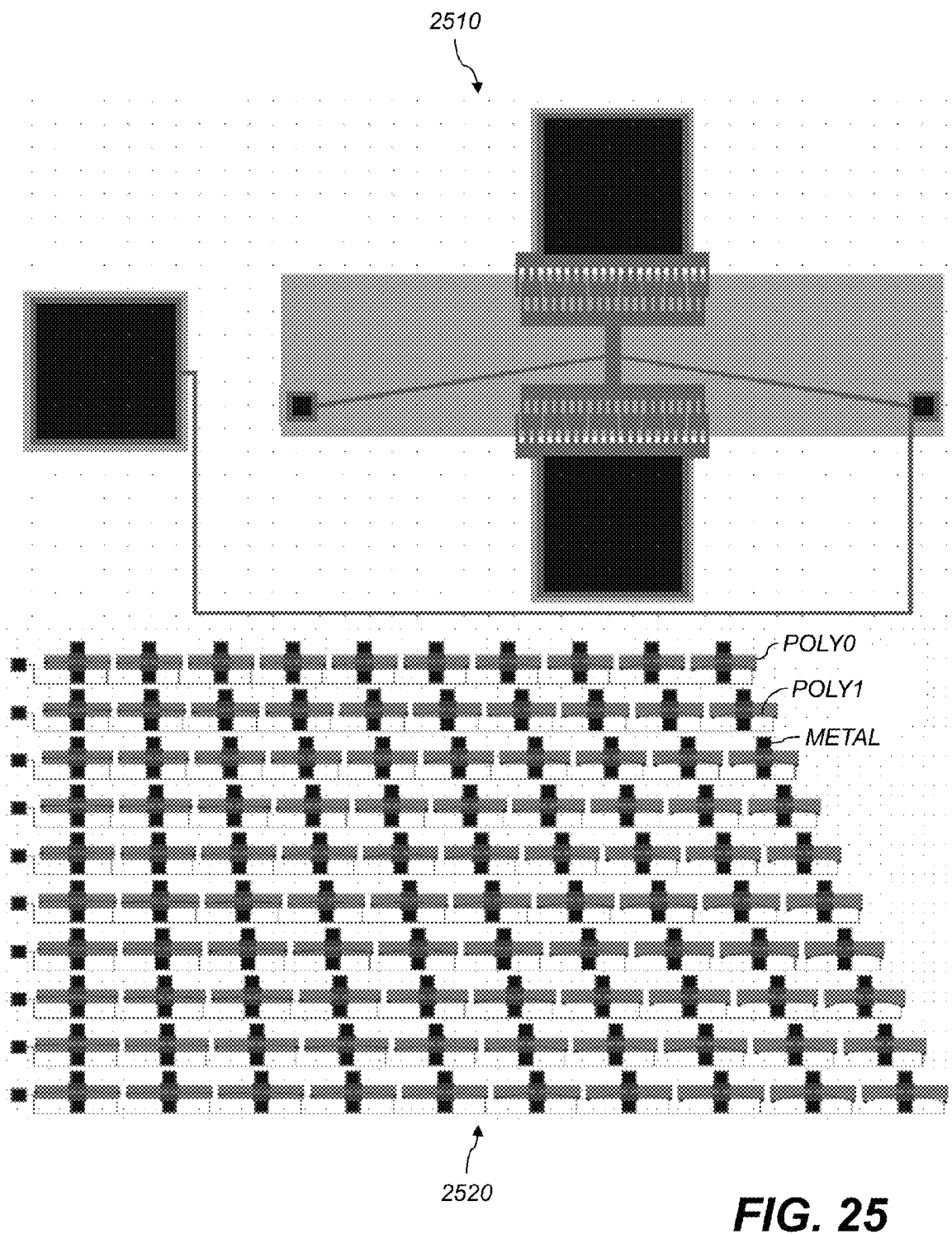
FIG. 25 shows an exemplary structure and an exemplary 2D layout array generated by sweeping 2 parameters: flexure length and flexure angle.

Automated layout in GyroCube is an efficient function for generating GDS-II layout arrays for fabrication. FIG. 25 illustrates the generation of a 2D layout array in GDS-II format that is generated by sweeping 2 parameters: flexure length and flexure angle. Structure 2510 is a GyroCube instance of one device, and layout 2520 is a GDS-II output file (as loaded into a free GDS-II reader called CLEWIN3.2.2). A layout feature according to various aspects is adapted to automatically configure tracers, ground pads, anchor layer connect, and optimize real estate spacing between each structure as seen in FIG. 25 [B7]. Examples of structures on POLY0, POLY1, and METAL layers are shown. The structure can also include ANCHOR1 and ANCHOR2 layers/ For example, ANCHOR1 can underlie and laterally surround METAL pads. This is similar to the example shown in FIG. 9, discussed above.

GyroCube can produce a layout in GDS-II format. In addition to plotting a performance manifold due to sweeping flexure length and angle parameters, the user can push the Layout button to cause GyroCube to produce a corresponding layout array (2520) that is ready for fabrication. Flexure length is swept along the vertical array axis and flexure angle is swept along the horizontal array axis. One can also see ground planes, tracers, bond pads, and anchor layer connects [B7], e.g., as discussed above with reference to FIGS. 9-11.

Various aspects use SugarCube to host a gyro-specific design automation tool called GyroCube. The tool can advantageously help users to rapidly explore design spaces and optimize the performance of MEMS gyroscopes. GyroCube's versatility allows it to be used to perform gyroscope analysis on various MEMS structures imported from Sugar.

In addition to Sugar's pre-existing MEMS solvers, such as frequency response, modal analysis, and transient analysis, additional gyroscope-specific analyses can be performed, such as quality factor analysis, normalized sensitivity analysis, resonant frequency analysis, stiffness, or damping ratio. Other functions such as geometry optimization given desired performance and the generation of layout arrays can be performed. A simulation was performed to verify GyroCube's compact modeling results using finite element analysis with a relative error less than 3% in the example tested.

Figure 29:
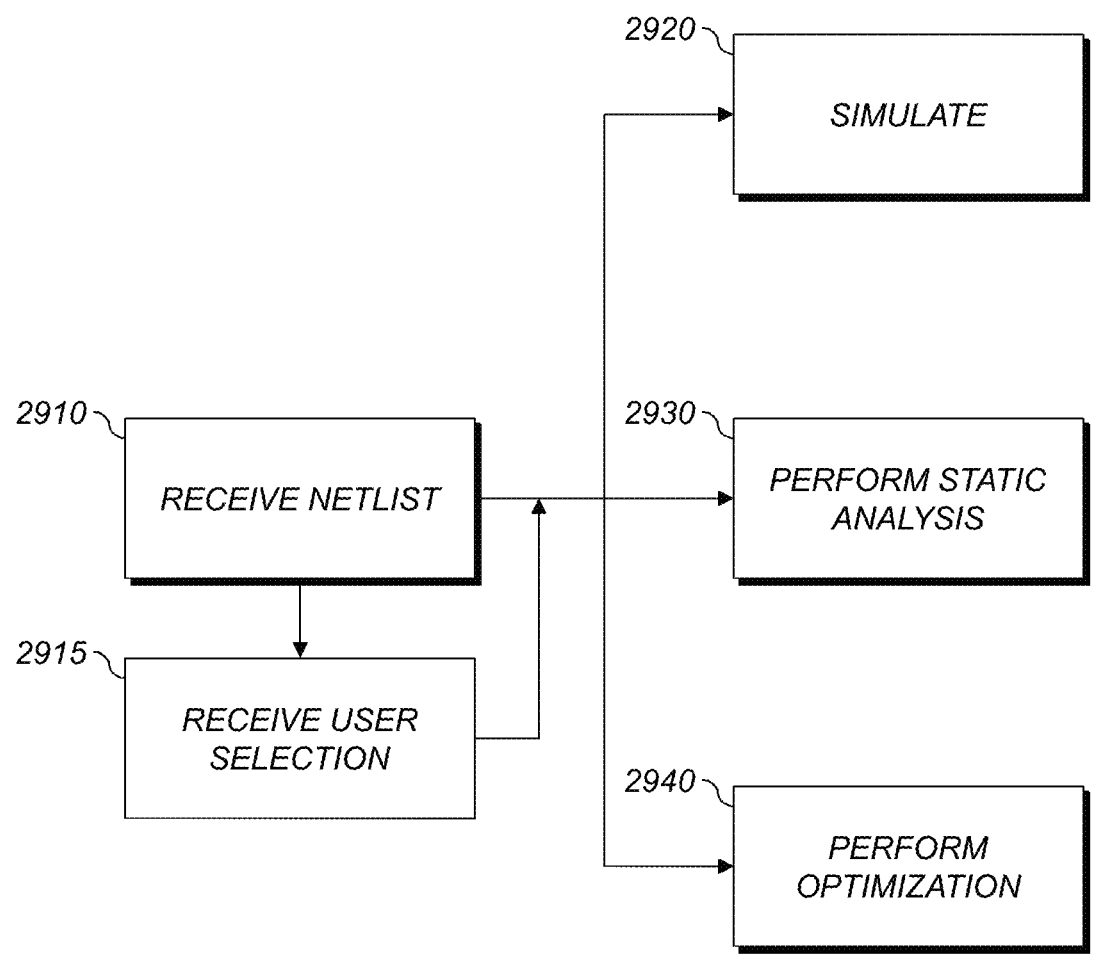
FIG. 29 shows various methods of processing structures.

FIG. 29 shows various methods of processing structures. In step 2910, a netlist (e.g., a Sugar netlist) is received. Step 2910 can be followed by steps 292, 2930, or 2940. In step 2920, simulation is performed to determine characteristics of the structure. In step 2930, static analysis is performed. In step 2940, optimization is performed. These are discussed above. Steps 2920, 2930, 2940 can be used in combination or separately, and can be used in any order. In various aspects, step 2910 is followed by step 2915, in which a user selection of analysis is received (e.g., the user clicks a corresponding button). Step 2915 is followed by step 2920, 2930, or 2940 according to the user's choice.

FIG. 26 is a high-level diagram showing the components of an exemplary data-processing system for analyzing data and performing other analyses described herein. The system includes a data processing system 2610, a peripheral system 2620, a user interface system 2630, and a data storage system 2640. The peripheral system 2620, the user interface system 2630 and the data storage system 2640 are communicatively connected to the data processing system 2610. Data processing system 2610 can be communicatively connected to network 2650, e.g., the Internet or an X.25 network, as discussed below. Various software tools or methods described herein, e.g., FIGS. 1, 16, 17, Sugar, SugarCube, GyroCube, Sugar2GDSII, or genetic programs, can each be executed on a data processing system 2610 using one or more of systems 2620, 2630, 2640, and optionally connecting to one or more network(s) 2650. Devices embodying such flowcharts or programs in computer-readable media can also be provided.

The data processing system 2610 includes one or more data processor(s) that implement processes of various aspects described herein. A "data processor" is a device for automatically operating on data and can include a central processing unit (CPU), a desktop computer, a laptop computer, a mainframe computer, a personal digital assistant, a digital camera, a cellular phone, a smartphone, or any other device for processing data, managing data, or handling data, whether implemented with electrical, magnetic, optical, biological components, or otherwise.

The phrase "communicatively connected" includes any type of connection, wired or wireless, between devices, data processors, or programs in which data can be communicated. Subsystems such as peripheral system 2620, user interface system 2630, and data storage system 2640 are shown separately from the data processing system 2610 but can be stored completely or partially within the data processing system 2610.

The data storage system 2640 includes or is communicatively connected with one or more tangible non-transitory computer-readable storage medium(s) configured to store information, including the information needed to execute processes according to various aspects. A "tangible non-transitory computer-readable storage medium" as used herein refers to any non-transitory device or article of manufacture that participates in storing instructions which may be provided to a processor, e.g., data processing system 2610, for execution. Such a non-transitory medium can be non-volatile or volatile. Examples of non-volatile media include floppy disks, flexible disks, or other portable computer diskettes, hard disks, magnetic tape or other magnetic media, Compact Discs and compact-disc read-only memory (CD-ROM), DVDs, BLU-RAY disks, HD-DVD disks, other optical storage media, Flash memories, read-only memories (ROM), and erasable programmable read-only memories (EPROM or EEPROM). Examples of volatile media include dynamic memory, such as registers and random access memories (RAM). Storage media can store data electronically, magnetically, optically, chemically, mechanically, or otherwise, and can include electronic, magnetic, optical, electromagnetic, infrared, or semiconductor components.

Aspects of the present invention can take the form of a computer program product embodied in one or more tangible non-transitory computer readable medium(s) having computer readable program code embodied thereon. Such medium(s) can be manufactured as is conventional for such articles, e.g., by pressing a CD-ROM. The program embodied in the medium(s) includes computer program instructions that can direct data processing system 2610 to perform a particular series of operational steps when loaded, thereby implementing functions or acts specified herein.

In an example, data storage system 2640 includes code memory 2641, e.g., a random-access memory, and disk 2643, e.g., a tangible computer-readable rotational storage device such as a hard drive. Computer program instructions are read into code memory 2641 from disk 2643, or a wireless, wired, optical fiber, or other connection. Data processing system 2610 then executes one or more sequences of the computer program instructions loaded into code memory 2641, as a result performing process steps described herein. In this way, data processing system 2610 carries out a computer implemented process. For example, blocks of the flowchart illustrations or block diagrams herein, and combinations of those, can be implemented by computer program instructions. Code memory 2641 can also store data, or not: data processing system 2610 can include Harvard-architecture components, modified-Harvard-architecture components, or Von-Neumann-architecture components.

Computer program code can be written in any combination of one or more programming languages, e.g., JAVA, Smalltalk, C++, C, or an appropriate assembly language. Program code to carry out methods described herein can execute entirely on a single data processing system 2610 or on multiple communicatively-connected data processing systems 2610. For example, code can execute wholly or partly on a user's computer and wholly or partly on a remote computer or server. The server can be connected to the user's computer through network 2650.

The peripheral system 2620 can include one or more devices configured to provide digital content records to the data processing system 2610. For example, the peripheral system 2620 can include digital still cameras, digital video cameras, cellular phones, or other data processors. The data processing system 2610, upon receipt of digital content records from a device in the peripheral system 2620, can store such digital content records in the data storage system 2640.

The user interface system 2630 can include a mouse, a keyboard, another computer (connected, e.g., via a network or a null-modem cable), or any device or combination of devices from which data is input to the data processing system 2610. In this regard, although the peripheral system 2620 is shown separately from the user interface system 2630, the peripheral system 2620 can be included as part of the user interface system 2630.

The user interface system 2630 also can include a display device, a processor-accessible memory, or any device or combination of devices to which data is output by the data processing system 2610. In this regard, if the user interface system 2630 includes a processor-accessible memory, such memory can be part of the data storage system 2640 even though the user interface system 2630 and the data storage system 2640 are shown separately in FIG. 26.

In various aspects, data processing system 2610 includes communication interface 2615 that is coupled via network link 2616 to network 2650. For example, communication interface 2615 can be an integrated services digital network (ISDN) card or a modem to provide a data communication connection to a corresponding type of telephone line. As another example, communication interface 2615 can be a network card to provide a data communication connection to a compatible local-area network (LAN), e.g., an Ethernet LAN, or wide-area network (WAN). Wireless links, e.g., WiFi or GSM, can also be used. Communication interface 2615 sends and receives electrical, electromagnetic or optical signals that carry digital data streams representing various types of information across network link 2616 to network 2650. Network link 2616 can be connected to network 2650 via a switch, gateway, hub, router, or other networking device.

Network link 2616 can provide data communication through one or more networks to other data devices. For example, network link 2616 can provide a connection through a local network to a host computer or to data equipment operated by an Internet Service Provider (ISP).

Data processing system 2610 can send messages and receive data, including program code, through network 2650, network link 2616 and communication interface 2615. For example, a server can store requested code for an application program (e.g., a JAVA applet) on a tangible non-volatile computer-readable storage medium to which it is connected. The server can retrieve the code from the medium and transmit it through the Internet, thence a local ISP, thence a local network, thence communication interface 2615. The received code can be executed by data processing system 2610 as it is received, or stored in data storage system 2640 for later execution.

The invention is inclusive of combinations of the aspects described herein. References to "a particular aspect" and the like refer to features that are present in at least one aspect of the invention. Separate references to "an aspect" or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A method for producing layout data corresponding to a reference microdevice, the method comprising performing the following steps using a controller:
   receiving a three-dimensional model of the reference microdevice, the three-dimensional model including respective coordinates of a plurality of nodes and including one or more parameter(s);
   receiving a design-rule set including respective constraint(s) on the parameter(s);
   receiving respective parameter range(s) for the parameter(s), each parameter range including a plurality of values within the constraint(s) corresponding to the respective one of the parameter(s); and
   using the controller, automatically producing the layout data using the three-dimensional model and the parameter range(s), wherein the layout data includes two-dimensional data for each of one or more layer(s) and the layout data are produced by determining a plurality of combinations, each including one of the values in each of the parameter range(s), and, for each of the plurality of combinations, adjusting at least some of the coordinates in the three-dimensional model according to the values in that combination and converting the adjusted coordinates in the three-dimensional model to x-y coordinates and layer numbers, so that the layout data includes data for a plurality of microdevices.

2. The method according to claim 1, wherein the producing-layout-data step includes adjusting the x-y coordinates for each combination so that the layout data specifies that the plurality of microdevices be positioned closely in a nonrectangular array.

3. The method according to claim 1, wherein the producing-layout-data step includes adjusting the x-y coordinates for each combination so that the layout data specifies that the plurality of microdevices be positioned with bond pads aligned vertically and horizontally.

4. The method according to claim 1, wherein at least some of the coordinates in the three-dimensional model correspond to a structure, the method further including automatically performing the following steps using the controller:
   receiving an indication of whether the structure needs to be released;
   if the structure is indicated as needing to be released, using the design-rule set, automatically determining whether the structure requires etch holes; and
   if the structure does require etch holes, modifying the produced layout data according to the design-rule set to include etch holes for the structure.

5. The method according to claim 1, further including automatically performing the following steps using the controller:
   receiving an indication of whether bonding pads are required;
   if bonding pads are indicated as being required, modifying the produced layout data according to the design-rule set to add bond pads associated with coordinates specified in the three-dimensional model.

6. The method according to claim 1, further including automatically performing the following steps using the controller:
   receiving an indication of whether common voltage tracers are required;
   if common voltage tracers are indicated as being required, modifying the produced layout data according to the design-rule set to add common voltage tracers associated with a common pad specified in the three-dimensional model.

7. The method according to claim 6, further including, if common voltage tracers are indicated as being required, modifying the produced layout data according to the design-rule set to add additional metal to the common voltage tracers.

8. The method according to claim 1, wherein the step of receiving the respective parameter range(s) for the parameter(s) includes:
   presenting a plurality of user-interface controls to a user via a display, wherein:
      each user-interface control corresponds to one of the parameters and is operative to permit the user to specify values within the corresponding constraint; and
      the plurality of user-interface controls includes at least two controls for each parameter so that the controls for each parameter permit the user to specify the parameter range for that parameter; and
   receiving data of the parameter range(s) from the user-interface controls via a user-input device.

9. A non-transitory tangible computer-readable medium having computer-executable instructions stored thereon for processing data of a three-dimensional model of a reference microdevice, the instructions comprising:
   instructions to automatically receive the three-dimensional model of the reference microdevice, the three-dimensional model including respective coordinates of a plurality of nodes and including one or more parameter(s);
   instructions to receive a design-rule set including respective constraint(s) on the parameter(s);
   instructions to receive respective parameter range(s) for the parameter(s), each parameter range including a plurality of values within the constraint(s) corresponding to the respective one of the parameter(s); and
   instructions to produce the layout data using the three-dimensional model and the parameter range(s), wherein the layout data includes two-dimensional data for each of one or more layer(s) and the instructions to produce the layout data include instructions to determine a plurality of combinations, each including one of the values in each of the parameter range(s), and instructions to, for each of the plurality of combinations, adjust at least some of the coordinates in the three-dimensional model according to the values in that combination and to convert the adjusted coordinates in the three-dimensional model to x-y coordinates and layer numbers, so that the layout data includes data for a plurality of microdevices.

10. The computer-readable medium according to claim 9, wherein at least some of the coordinates in the three-dimensional model correspond to a structure, the instructions further including:
   instructions to receive an indication of whether the structure needs to be released;
   instructions to, using the design-rule set, automatically determine whether the structure requires etch holes if the structure is indicated as needing to be released; and instructions to modify the produced layout data according to the design-rule set if the structure does require etch holes to include etch holes for the structure.

\* \* \* \* \*